US012756628B1

(12) United States Patent
Ambatipudi et al.

(10) Patent No.: US 12,756,628 B1
(45) Date of Patent: Oct. 6, 2026

(54) AUTOMATIC CONFIGURATION OF VIRTUAL INTERFACES OF A CONTAINERIZED NETWORK ROUTER, USING HARDWARE ATTRIBUTES

(71) Applicant: Juniper Networks, Inc., Sunnyvale, CA (US)

(72) Inventors: Lavanya Kumar Ambatipudi, Fremont, CA (US); Kirankumar Kashinath Raikar, Bangalore (IN); Shubham Gaur, Bangalore (IN); Srinivasan Neelamegam Dhamotharan, Ottawa (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 316 days.

(21) Appl. No.: 18/621,882

(22) Filed: Mar. 29, 2024

(51) Int. Cl.
*H04L 41/0895* (2022.01)

(52) U.S. Cl.
CPC ................................ *H04L 41/0895* (2022.05)

(58) Field of Classification Search
CPC ................................................... H04L 41/0895
See application file for complete search history.

(56) References Cited

U.S. PATENT DOCUMENTS

2015/0381494 A1* 12/2015 Cherian ................ H04L 45/745
370/392
2020/0278892 A1* 9/2020 Nainar .................... H04L 67/10
2022/0158926 A1* 5/2022 Wennerström .......... H04L 43/50
2022/0217047 A1* 7/2022 Pianigiani ............. G06F 9/4416
2022/0278927 A1 9/2022 Mariappan et al.
2022/0279420 A1 9/2022 Akkipeddi et al.

OTHER PUBLICATIONS

Kn et al., "Day One: Contrail DPDK vRouter", Juniper Networks, Inc., Engineering Simplicity, 2021, 196 pp., (Applicant points out, in accordance with MPEP 609.04(a), that the year of publication, 2021, is sufficiently earlier than the effective U.S. filing date, so that the particular month of publication is not an issue.).

* cited by examiner

*Primary Examiner* — Austin J Moreau
(74) *Attorney, Agent, or Firm* — Shumaker & Sieffert P.A.

(57) ABSTRACT

A computing system comprises a containerized network router (CNR) including a virtual router that implements a data plane and is configurable with virtual interfaces configured for different functionality on a per-physical interface basis according to hardware attributes of physical interfaces of the computing system. In one example, a CNR receives information specifying one or more hardware attributes of each physical interface of the physical interfaces. For each physical interface, the CNR obtains, based at least in part on the corresponding hardware attributes of the physical interface, a corresponding configuration for a corresponding virtual interface. The CNR configures each virtual interface with the corresponding configuration to cause the virtual router to perform forwarding of network traffic to the corresponding physical interface.

20 Claims, 8 Drawing Sheets

AUTOMATIC CONFIGURATION OF VIRTUAL INTERFACES OF A CONTAINERIZED NETWORK ROUTER, USING HARDWARE ATTRIBUTES

TECHNICAL FIELD

This disclosure generally relates to virtualized computing infrastructure and, more specifically, to a containerized network router.

BACKGROUND

In a typical cloud data center environment, there is a large collection of interconnected servers that provide computing and/or storage capacity to run various applications. For example, a data center may include a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

A cloud data center environment, such as a virtualized data center may provide services for any number of customers. For example, a cloud data center environment may provide services to different customers via virtual private clouds (VPCs). A VPC may be viewed as an extension of a customer operated on-premises (on-prem) network which may be located on the premises of a customer site. As such, through the use of a VPC, a customer may quickly and efficiently scale their on-prem network as needed by adding or subtracting resources resident in a cloud data center through a VPC rather than changing the resources in the on-prem network itself. A VPC implementation may include the use of a virtual private cloud gateway device.

SUMMARY

In general, the disclosure describes techniques for configuring, by a containerized network router (CNR) executing on a computing device with multiple physical interfaces having different hardware attributes, virtual interfaces of a virtual router on a per-physical interface basis according to the hardware attributes of the corresponding physical interfaces, so as to enable the CNR to take advantage of the capabilities of different types of physical interfaces of the underlying computing device.

In one example, a computing system comprises hardware-based physical interfaces and processing circuitry that executes a CNR including a virtual router that implements a data plane, the virtual router comprising virtual interfaces. The CNR receives information specifying one or more hardware attributes of each of the hardware-based physical interfaces. For each of the physical interfaces, the CNR obtains, based at least in part on the respective one or more hardware attributes of the physical interface a configuration for a corresponding virtual interface of the virtual interfaces of the virtual router. In some examples, the information specifying one or more hardware attributes indicate, e.g., that a first interface of the hardware-based physical interfaces has a Dynamic Device Personalization (DDP) capability, while a second interface of the hardware-based physical interfaces does not have a DDP capability.

The CNR configures each virtual interface of the virtual interfaces with the respective configuration to perform forwarding of network traffic to the respective physical interface of the physical interfaces. For example, the CNR configures a first virtual interface for the first physical interface, and further configures a first Network Interface Controller (NIC) associated with the first physical interface to perform hardware-based load-balancing of network traffic forwarded via the first physical interface in accordance with DDP. Further, the CNR configures a second virtual interface for the second physical interface, and configures the virtual router to perform software-based load-balancing of network traffic forwarded via the second physical interface. In some examples, the CNR configures each virtual interface of the virtual interfaces with the respective configuration so as to perform load balancing of the network traffic across the physical interfaces, in accordance with the one or more hardware attributes of each physical interface of the physical interfaces, and despite the physical interfaces comprising different attributes of the one or more hardware attributes.

The techniques of the disclosure may provide specific improvements to the computer-related field of computer networking that have practical applications. For example, the techniques of the disclosure may enable a CNR executing on a computing device, such as a server, that has different types of hardware-based physical interfaces (such as NICs of different vendors, makes, models, or software versions) to take advantage of the different functionalities and features of such different types of hardware-based physical interfaces, instead of limiting such a CNR to using only such functionalities and features as supported by every one of the hardware-based physical interfaces. For example, on a computing device that includes hardware-based physical interfaces that support DDP and hardware-based physical interfaces that do not support DDP, the techniques of the disclosure may enable a CNR executing on the computing device to make use of DDP to perform hardware-based load-balancing of network traffic forwarded by the respective physical interfaces that support DDP, while simultaneously performing software-based load-balancing of network traffic forwarded by the respective physical interfaces that do not support DDP. Additionally, the techniques of the disclosure may enable a CNR to take into account the various different functionalities and features of different types of hardware-based physical interfaces provided within a single computing device so as to perform load-balancing of network traffic across the various physical interfaces of the computing device, regardless of (or despite the existence of) such physical interfaces supporting, (or not supporting), such various different functionalities and features. Therefore, the techniques of the disclosure may improve the network throughput of and reduce network congestion within a computing device that has different types of physical interfaces. Furthermore, the techniques of the disclosure may reduce the administrative overhead of configurating such a computing device that has different types of physical interfaces. Moreover, by improving the efficiency of a computing device that has different types of physical interfaces and allowing a CNR to take advantage of different features provided by different physical interfaces and components of a computing device, the techniques of the disclosure may reduce operational costs and administrative overhead by allowing for the use of new components and older components within a same chassis of a computing device, thereby increasing the longevity of computing equipment.

In one example, this disclosure describes a computing system comprising: hardware-based physical interfaces; storage media; and processing circuitry in communication with the storage media, the processing circuitry is configured to: execute a virtual router that implements a data plane and is configurable with virtual interfaces; receive information specifying one or more hardware attributes of each physical interface of the physical interfaces; for each physical interface of the physical interfaces, obtain, based at least in part on the corresponding one or more hardware attributes of the physical interface, a corresponding configuration for a corresponding virtual interface of the virtual interfaces of the virtual router; and configure each virtual interface of the virtual interfaces with the corresponding configuration to cause the virtual router to perform forwarding of network traffic to the corresponding physical interface of the physical interfaces.

In another example, this disclosure describes a method comprising: executing, by processing circuitry of a computing system comprising hardware-based physical interfaces, a virtual router that implements a data plane and is configurable with virtual interfaces; receiving, by the processing circuitry, information specifying one or more hardware attributes of each physical interface of the physical interfaces; for each physical interface of the physical interfaces, obtaining, by the processing circuitry, based at least in part on the corresponding one or more hardware attributes of the physical interface, a corresponding configuration for a corresponding virtual interface of the virtual interfaces of the virtual router; and configuring, by the processing circuitry, each virtual interface of the virtual interfaces with the corresponding configuration to cause the virtual router to perform forwarding of network traffic to the corresponding physical interface of the physical interfaces.

In another example, this disclosure describes non-transitory, computer-readable media comprising instructions that, when executed, are configured to cause processing circuitry to: execute a virtual router that implements a data plane and is configurable with virtual interfaces; receive information specifying one or more hardware attributes of each physical interface of physical interfaces of a computing system; for each physical interface of the physical interfaces, obtain, based at least in part on the corresponding one or more hardware attributes of the physical interface, a corresponding configuration for a corresponding virtual interface of the virtual interfaces of the virtual router; and configure each virtual interface of the virtual interfaces with the corresponding configuration to cause the virtual router to perform forwarding of network traffic to the corresponding physical interface of the physical interfaces.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
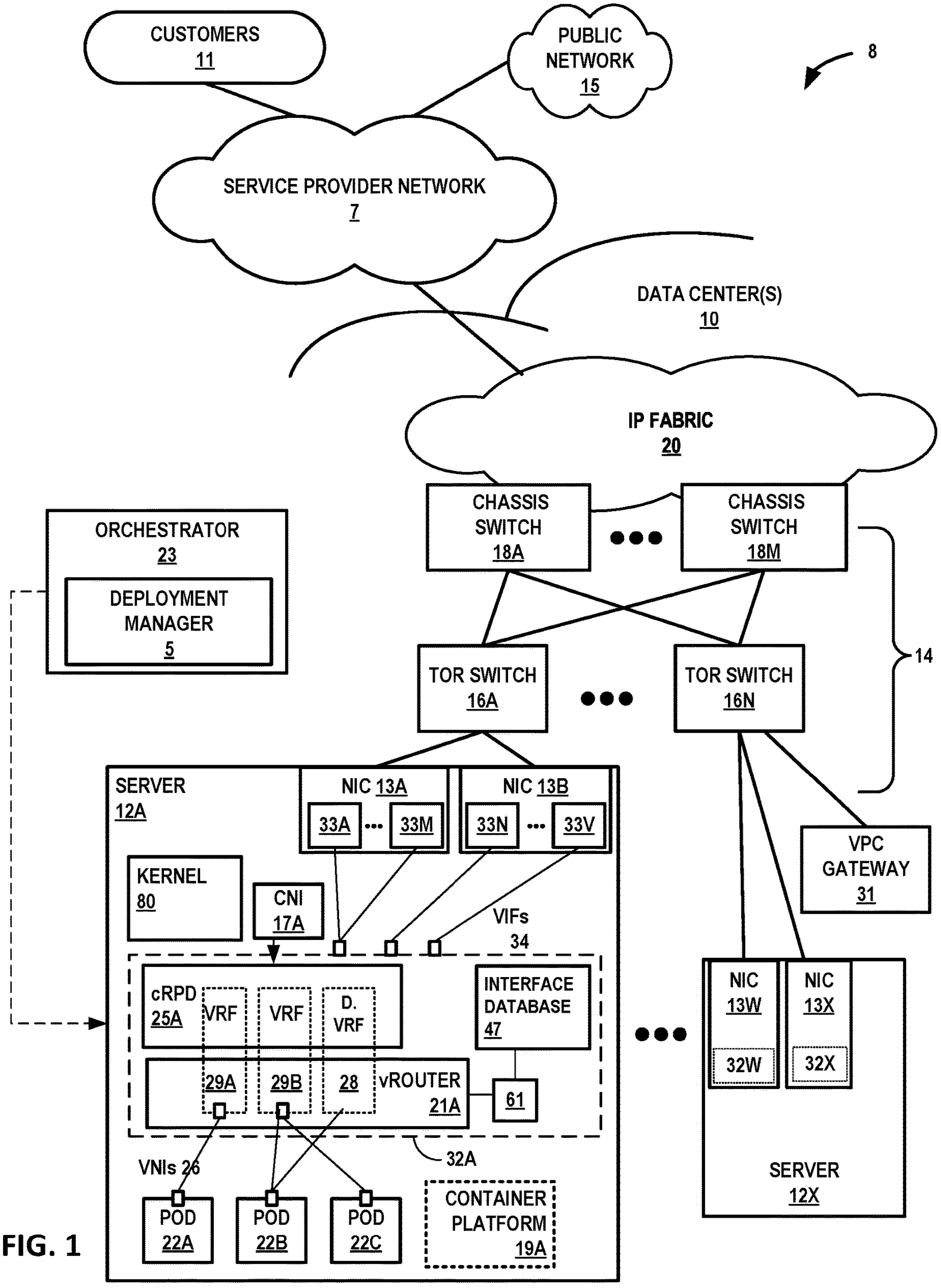
FIG. 1 is a block diagram illustrating an example computing infrastructure in which examples of the techniques described herein may be implemented.

A cloud-native approach may include functional blocks which are decomposed into microservices. The microservices are deployed as containers on compute nodes and orchestrated by an orchestration system, such as Kubernetes (abbreviated as "Kubernetes"). Kubernetes deploys containers using Pods. Kubernetes networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a network, such as a telecommunications network. A CNR, as described herein, provides a better fit for these situations. A CNR is a containerized router that allows a compute node, such as an x86- or ARM-based host, to be a first-class member of the network routing system, participating in protocols such as Intermediate System to Intermediate System (IS-IS) and Border Gateway Protocol (BGP) and providing Multiprotocol Label Switching/Segment Routing (MPLS/SR)-based transport and multi-tenancy. In other words, rather than the platform being an appendage to the network (like a customer edge (CE) router), it may be operating as a provider edge (PE) router or other device within a provider network, such as a in a cloud computing environment.

A CNR may have one or more advantages over a conventional router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the CNR is a virtualized router. However, the routing protocol software is functionally similar in both cases. This means the CNR benefits from the same highly comprehensive and robust protocol implementation as the hardware-based routers that underpin some of the world's largest networks.

The CNR uses a containerized routing protocol daemon (cRPD) Control Plane and a virtual router (vRouter) forwarding plane to deliver high performance networking in a small footprint, software package that is functionally similar to a non-virtual router, a physical network function (PNF). The forwarding plane may be implemented via a choice of DPDK, Linux Kernel or Smart-NIC. The complete integration delivers a Kubernetes CNI-compliant package, deployable within a Kubernetes environment (e.g., Multus-enabled).

As the CNR is itself a cloud-native application, it supports installation using Kubernetes manifests or Helm Charts. These include the initial configuration of the router, including routing protocols and Layer 3 VPNs to support slices. A CNR may be orchestrated and configured, in a matter of seconds, with all of the routing protocol adjacencies with the rest of the network up and running. Ongoing configuration changes during the lifetime of the CNR, for example to add or remove network slices, may be via a choice of CLI, Kubernetes manifests, NetConf or Terraform.

In general, deployment manager 5 defines, deploys, and upgrades applications using an application package that is to be deployed to and runs on any one or more of servers 12. Deployment manager 5 may be an instance of Helm. In general, an application package is a collection of files that describe one or more resources available via the container orchestration platform. The Helm deployment manager, for example, uses a package definition known as a Helm chart to describe a related set of Kubernetes resources. The application package can include:

- A package definition containing information about the package.
- One or more template files ("templates") that each includes variables.
- One or more values files having values for variables of the templates.

Deployment manager 5 can combine a template with a values file to generate a manifest file that describes each component or resource of the application to be deployed, as well as the intended state of the cluster once the manifest is applied to the cluster. A manifest file can be YAML-formatted resource descriptions that is understood by the container orchestration platform, e.g., Kubernetes. In this way, deployment manager 5 may generate a manifest file for any of virtual routers 21, for use by orchestrator 23 to deploy and configure the virtual router 21 on its server 12.

By adopting a Kubernetes CNI framework, the CNR may mitigate the traditional operational overhead incurred when using a containerized appliance rather than its physical counterpart. By exposing the appropriate device interfaces, the CNR may normalize the operational model of the virtual appliance to the physical appliance, eradicating the barrier to adoption within the operator's network operations environment. The CNR may present a familiar routing appliance look-and-feel to any trained operations team. The CNR has similar features and capabilities, and a similar operational model as a hardware-based platform. Likewise, a domain-controller can use the protocols that it is uses with any other router to communicate with and control the CNR, such as Netconf/OpenConfig, gRPC, Path Computation Element Protocol (PCEP), or Programmable Routing Daemon (pRPD) APIs.

The node executing a CNR may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The CNR acts as a provider edge (PE) router from the Layer 3 VPN point of view. The CNR therefore exchanges Layer 3

VPN prefixes via BGP with other PE routers in the network, regardless of whether those other PEs are physical routers or CNRs residing on other hosts. Each tenant may be placed in a separate VRF table on each PE, giving the correct degree of isolation and security between tenants, just as with a conventional Layer 3 VPN service. This neatly solves the problem that Kubernetes does not natively provide such isolation. Layer 3 VPN is a tried and tested method for achieving multi-tenancy in networking and is trusted by the many major corporations worldwide who buy this service from their network service providers.

FIG. 1 is a block diagram illustrating an example computing infrastructure according to one or more aspects of this disclosure. In general, one or more data center(s) 10 provide an operating environment for applications and services for customer sites 11 (illustrated as "customers 11") having one or more customer networks coupled to the data center by service provider network 7, such as through VPCs. In some examples, customer sites 11 may be on-premises (on-prem) customer networks. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." For example, each of servers 12 may represent a computing device, such as an x86 processor-based server, configured to operate according to techniques described herein. Although only server 12A coupled to TOR switch 16A is shown in detail in FIG. 1, data center 10 may include many additional servers coupled to other TOR switches 16 of the data center 10.

Data center(s) may provide Virtual Private Clouds (VPCs) to any of customers 11. Data center(s) 10 may include one or more VPC gateways, such as VPC gateway 31, which may be used to connect VPCs to external networks (e.g., on-prem, other clouds, external VPCs) to provide VPC services to customers 11. VPC gateway 31 may be a physical device or a virtual device, such as a physical or virtual gateway, router, switch or the like. In some examples, VPC gateway 31 may be implemented by one or more of servers 12. In some examples, an CNR may be directly coupled to a VPC gateway.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to, and extended across, physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual routers 21A-21X (illustrated as and also collectively referred to herein as "vRouters 21"), virtual routers running in servers 12 may create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface controller (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network interface controller" or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). In some examples, packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface controller 13A of server 12A that executes the virtual router. The outer header may include not only the physical network address of the network interface controller 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. Hereinafter, description of virtual routers is made primarily with respect to virtual router 21A, but such description is relevant to other instances of virtual routers 21.

In some examples, for example, for each of the packets outbound from virtual network endpoints hosted by server 12A (e.g., any of pods 22A-22C), virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, virtual router 21A may execute the operations of a tunnel endpoint to encapsulate inner packets sourced by virtual network endpoints to generate tunnel packets and decapsulate tunnel packets to obtain inner packets for routing to other virtual network endpoints.

A containerized routing protocol daemon (cRPD) is a routing protocol process that is packaged and deployed as a container. cRPD may be executed in the user space of the host as a containerized process. Thus, cRPD makes available the rich routing software pedigree of physical routers on compute nodes. cRPD provides control plane functionality to a containerized router. Existing implementations of cRPD (running on the host) use the forwarding provided by the kernel. This control plane is thus containerized. The compute nodes and kernel may be Linux-based in some examples.

A virtual router is a software entity that provides data plane functionality on the compute node, while the cRPD may provide the control plane functionality. The compute node may be hosting virtual compute instances centrally orchestrated and provisioned. In some cases, the virtual router may further interact with an SDN controller to create overlay networks by exchanging routes, configurations, and other data. A virtual router can run as a DPDK-based process. DPDK allows a virtual router to process more packets per second than is possible when running as a kernel module. The virtual router data plane may be containerized. In combination, the containerized cRPD and containerized virtual router may thus be a fully functional, containerized router.

Virtual router 21A may be a Data Plane Development Kit (DPDK)-enabled virtual router. In such examples, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages the NIC 13A. This includes packets polling, packets processing, and packets forwarding. User packet processing steps may be performed by the virtual router 21A DPDK data plane with limited or no participation by the kernel 80. The nature of this "polling mode" makes the virtual router 21A DPDK data plane packet processing/forwarding much more efficient as compared to the interrupt mode, particularly when the packet rate is high. There are limited or no interrupts and context switching during packet I/O.

Additional details of an example of a DPDK vRouter are found in "DAY ONE: CONTRAIL DPDK vROUTER," 2021, Kiran K N et al., Juniper Networks, Inc., which is incorporated by reference herein in its entirety.

Servers 12 include and execute containerized routing protocol daemons 25A-25X (collectively, "cRPDs 25"). A containerized routing protocol daemon (CRPD) is a routing protocol process that is packaged as a container and may run in Linux-based environments. cRPD may be executed in the user space of the host as a containerized process. Thus, cRPD makes available the rich routing software pedigree of physical routers on Linux-based compute nodes, e.g., servers 12 in some cases. cRPD provides control plane functionality. This control plane is thus containerized. For example, cRPD 25A implements the control plane for a CNR 32A executed by server 12A.

Virtual routers 21, meanwhile, are the software entities that provide data plane functionality on servers 12. cRPD 25A may alternatively use a DPDK-enabled or SmartNIC-executed instance of virtual router 21. In some cases, a virtual router 21A may work with an SDN controller to create the overlay network by exchanging routes, configurations, and other data. Virtual router 21A may be containerized. In combination, the containerized cRPD and containerized virtual router may thus be a fully functional containerized, CNR 32A in some examples. Additional description of cRPD 25A and its relationship to virtual router 21A is found in U.S. Patent Publication No. 2022/0279420, published 1 Sep. 2022 and titled "CONTAINERIZED ROUTER WITH VIRTUAL NETWORKING," which is incorporated by reference herein in its entirety Computing infrastructure 8 implements an automation platform for automating deployment, scaling, and operations of virtual execution elements across servers 12 to provide virtualized infrastructure for executing application workloads and services. In some examples, the platform may be an orchestration system. In some cases, the orchestration system is a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12 and orchestrator 23. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes. A Kubernetes cluster is an example of an orchestration system cluster.

Orchestrator 23 may be a distributed application that executes on one or more computing devices, such as servers 12 or other computing devices. Orchestrator 23 may implement master nodes for one or more clusters each having one or more minion nodes implemented by respective servers 12 (also referred to as "compute nodes").

In general, orchestrator 23 controls the deployment, scaling, and operations of containers across clusters of servers 12 and providing computing infrastructure, which may include container-centric computing infrastructure. Orchestrator 23 may implement respective cluster masters for one or more Kubernetes clusters. As an example, Kubernetes is a container management platform that provides portability across public and private clouds, each of which may provide virtualization infrastructure to the container management platform.

Kubernetes operates using a variety of Kubernetes objects-entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22. Container platform 19A receives requests from orchestrator 23 to obtain and host, in server 12A, containers. Container platform 19A obtains and executes the containers.

Container network interface (CNI) 17A configures virtual network interfaces for virtual network endpoints. The orchestrator 23 and container platform 19A use CNI 17A to manage networking for pods, including pods 22. For example, CNI 17A creates virtual network interfaces to connect pods 22 to virtual router 21A and enables containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 may create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 22.

CNI 17A may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

By adopting a Kubernetes CNI framework in some examples, CNR 32A may mitigate the traditional operational overhead incurred when using a containerized appliance rather than its physical counterpart. By exposing the appropriate device interfaces, CNR 32A may normalize the operational model of the virtual appliance to the physical appliance, eradicating the barrier to adoption within the operator's network operations environment. CNR 32A (and more specifically the interface to cRPD 25A) may present a familiar routing appliance look-and-feel to any trained operations team. CNR 32A has similar features and capabilities, and a similar operational model as a hardware-based platform. Likewise, a domain-controller can in some cases use the protocols that it uses with any other router to communicate with and control CNR 32A, for example Netconf/OpenConfig, gRPC, Path Computation Element Protocol (PCEP), or other interfaces.

CNR 32A is effectively a virtualized router and may participate in IS-IS, Open Shortest Path First (OSPF), BGP, and/or other interior or exterior routing protocols and exchange routing protocol messages with other routers, whether physical routers or CNRs 32B-32X (CNRs 32A-32X are referred to herein collectively as "CNRs 32") residing on other hosts. In addition, MPLS may be used, often based on Segment Routing (SR). The reason for this is two-fold: to allow Traffic Engineering if needed, and to underpin multi-tenancy, by using VPNs, such as MPLS-based Layer 3 VPNs or EVPNs.

Each of Pods 22 includes one or more containers. In some examples, one or more of pods 22 include a containerized DPDK workload that is designed to use DPDK to accelerate packet processing, e.g., by exchanging data with other components using DPDK libraries. Virtual router 21 may execute as a containerized DPDK workload in some examples. Additional description of interface configuration for a DPDK pod is found in U.S. Patent Publication No. 2022/0278927, published 1 Sep. 2023 and titled "DATA INTERFACES WITH ISOLATION FOR CONTAINERS DEPLOYED TO COMPUTE NODES," which is incorporated by reference herein in its entirety.

Pods 22 are each configured with one or more virtual network interfaces (VNIs) 26 for sending and receiving packets with virtual router 21. In some examples, VNIs 26 provide high-throughput packet processing. Virtual network interfaces 26 may be a default interface for pods 22. Pods 22 may implement virtual network interface 26 as an Ethernet interface (e.g., named "eth0") while virtual router 21 may implement virtual network interfaces 26 as tap interfaces, virtio-user interfaces, or other type of interface. A tap interface is a virtual interface that is managed by a kernel and has no physical hardware component. Although described with respect to pods, VNIs 26 may be attached to other virtual execution elements such as virtual machines. A virtual network interface may alternatively be referred to as a Virtual Machine Interface (VMI) even if referring to a VNI for a Pod/container.

Pods 22 and virtual router 21 exchange data packets using virtual network interfaces 26. Virtual network interface 26 may be a DPDK interface. Pods 22 and virtual router 21 may set up virtual network interface 26 using vhost. Pods 22 may operate according to an aggregation model. Pods 22 may use a virtual device, such as a virtio device with a vhost-user adapter, for user space container inter-process communication for virtual network interface 26. In some examples, virtio is a shared memory-based solution for exchanging packets with virtual router 21A. The shared memory may be huge pages initialized in DPDK and managed by the virtio device. The workload of pod 22A is thus built on DPDK and operates virtual network interface 26 using DPDK. Pod 22A and virtual router 21A may bring up DPDK interfaces using vhost. Pod 22A may operate as a vhost server in some examples, with virtual router 21A as the vhost client, for setting up a DPDK interface. Virtual router 21A may operate as a vhost server in some examples, with pod 22A as the vhost client, for setting up a DPDK interface. In some examples, pods 22 may also use virtual ethernet ("veth") interfaces. Description hereinafter is made primarily with respect to pod 22A but can apply to other pods 22 or other virtual execution elements.

In examples where virtual router 21A is DPDK-enabled, virtual router 21A may execute concurrently with other DPDK applications, such as pod 22A, and may share resources, such as processing units (e.g., CPUs) and Peripheral Component Interconnect identifiers (PCI IDs) for virtual functions. Pod 22A may include containers that implement one or more functions of a mobile network, such as distributed units (DUs) or central units (CUs).

In DPDK, the PCI (Peripheral Component Interconnect) identifier is used to identify and communicate with network interfaces and other devices that are connected to the PCI bus of a computer system. The PCI identifier is composed of a combination of three IDs—the vendor ID, device ID, and subsystem ID, which are assigned by the PCI Special Interest Group (PCI-SIG) to each device connected to the PCI bus.

In addition to physical functions, many modern network interface controller (NICs) support virtual functions (VFs). VFs are a way to partition the resources of a physical NIC into multiple smaller virtual NICs, each with their own PCI identifier. These VFs are typically managed by a hypervisor or virtualization layer, which presents them to virtual machines (VMs), Pods, or other virtual computing instances running on the host as if the virtual NICs were physical NICs.

When DPDK is used in a virtualized environment with VFs, DPDK needs to be able to identify and communicate with these virtual devices using their unique PCI identifiers. The PCI identifier of a VF is composed of the same three IDs as a physical device, but with a different function ID to differentiate it from the physical function.

To communicate with VFs using DPDK, the VF PCI identifier is first discovered by the DPDK driver, typically via a VF discovery mechanism provided by the hypervisor or virtualization layer. The driver then uses the VF PCI identifier to allocate and configure resources for the VF, allowing it to function as a separate virtual NIC. In the example of FIG. 1, NIC 13A supports VFs.

CNI 17A may configure, for pod 22A, in conjunction with one or more other components shown in FIG. 1, a virtual network interface 26. Any of the containers of pod 22A may utilize, i.e., share, the virtual network interface(s) 26 of pod 22A.

A virtual network interface may represent a veth, where each end of the pair is a separate device (e.g., a Linux/Unix device), with one end of the pair assigned to pod 22A and one end of the pair assigned to virtual router 21A. The veth pair or an end of a veth pair are sometimes referred to as "ports". A virtual network interface may represent a macvlan network with media access control (MAC) addresses assigned to the pod 22A and to the virtual router 21A for communications between containers of pod 22A and virtual router 21A. Virtual network interfaces may alternatively be referred to as virtual machine interfaces (VMIs), pod interfaces, container network interfaces, tap interfaces, veth interfaces, or simply network interfaces (in specific contexts), for instance.

In some examples, cRPD 25A includes default VRF 28 (illustrated as "D. VRF 28") and VRFs 29A-29B (collectively, "VRFs 29"). Default VRF 28 stores the global routing table. cRPD 25A programs forwarding information derived from routing tables of VRFs 29 as forwarding tables into virtual router 21A. In this way, virtual router 21A implements the VPNs for VRFs 29, which are illustrated as included in both virtual router 21A and cRPD 25A.

NIC 13A includes physical network interfaces 33A-33M and NIC 13B includes physical network interfaces 33N-33V (collectively, "interfaces 33"), which are connected to switch fabric 14 and may be Ethernet interfaces. Interfaces 33 are hardware-based, physical interfaces (e.g., ports) and may send and receive packets, such as VPN service traffic, other layer 3 traffic, control/routing plane and routing protocol messages generated by or intended for cRPD 25A, or other packets, via a layer 3 network made up of one or more of switch fabric 14, IP fabric 20, service provider network 7, or public network 15.

In some examples, NICS 13 are hardware-based network adapters or network controllers. In some examples, a single server 12A may have multiple NICs 13, each of which may be the same make, model, and version of NIC, while in other examples, a single server 12A may have multiple NICs 13 having different makes, models, versions, software-based or hardware-based capabilities, as well as various types of different interfaces. For example, DDP is a technology that enables programmable packet processing pipeline provided by Intel as a profile to their NICs. Some NICs support this technology, and some do not. For example, the E810 Ethernet Controller, available from Intel, Corp., supports the use of DDP, while the E800 Ethernet Controller, also available from Intel, Corp., does not support the use of DDP. As described in more detail below, the techniques of the disclosure enable the use of certain software-based or hardware-based capabilities on a per-interface basis. For example, the techniques of the disclosure enable the use of DDP on interfaces of a single server 12A that support DDP, while disabling the use of DDP on other interfaces of the same server 12A that no not support DDP.

In the example server 12A of FIG. 1, pods 22 are virtual network endpoints in one or more virtual networks. Orchestrator 23 may store or otherwise manage configuration data for application deployments that specifies a virtual network and specifies that a pod 22 (or the one or more containers therein) is a virtual network endpoint of the virtual network. Orchestrator 23 may receive the configuration data from a user, operator/administrator, or other machine system, for instance.

Orchestrator 23 may provide interface configuration data to cause server 12A to create respective virtual network interfaces for one or more virtual networks (indicated in configuration data). Pod 22A may have a different virtual network interface for each virtual network to which it belongs, and this may be indicated in a manifest file for pod 22A. For example, virtual network interface 26 may be a virtual network interface for a particular virtual network. Additional virtual network interfaces (not shown) may be configured for other virtual networks. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

In some examples, a Pod can have multiple interfaces to different cRPD VRFs 29, e.g., one for management traffic, another for data traffic. In FIG. 1, pod 22B may use VRF 29B for management traffic and VRF 29A for data traffic, for instance.

A pod 22, e.g., pod 22A, might be connected to some physical interfaces where pod 22 learns IP addresses of other devices, such as User Equipment where the pod is implementing a mobile network gateway or a customer network subnet where the pod is implementing a CE router or gateway. In some examples, to advertise these IP addresses into the network, pod 22A treats the virtual network interface 26 with a VRF 29 as an IP link and advertises routes for these IP addresses to cRPD 25A. CRPD 25A can then advertise reachability for these IP addresses through cRPD 25A and pod 22A as a next hop, again conforming to a VPN service model. cRPD 25A programs virtual router 21 with corresponding forwarding information derived from the VRFs 29 and default VRF 28, and virtual router 21 forwarding VPN traffic according to the VPN service model to implement the VPNs.

CRPD 25A may apply many different types of overlay networks/VPNs, including L3VPN or EVPN (Type-2/Type-5), using a variety of underlay tunneling types, including MPLS, SR-MPLS, SRv6, MPLSoUDP, MPLSoGRE, or IP-in-IP, for example.

CNI 17A may configure, for pod 22*s*, in conjunction with one or more other components shown in FIG. 1, virtual network interfaces 26. Any of the containers of a pod 22 may utilize, i.e., share, any virtual network interface of the pod. Orchestrator 23 may store or otherwise manage virtual network interface configuration data for application deployments. Orchestrator 23 may receive specification for containerized applications ("pod specifications" in the context of Kubernetes) and network attachment definitions from a user, operator/administrator, or other machine system, for instance, and derive configuration data from this information for configuring VRFs 29 and default VRF 28; and configuring virtual network interfaces 26.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

The Kubernetes default behavior is for pods to communicate with one another. In order to apply network security policies, CNR 32A may use CNI 17A. For layer 3, isolation occurs at the network level and virtual networks operate at L3. Virtual networks are connected by policy. The Kubernetes native network policy provides security at layer 4. CNRs 32 may support Kubernetes network policies. Kubernetes network policy operates at the Kubernetes namespace boundary. The SDN architecture may support application-based security. (These security policies can in some cases be based upon metatags to apply granular security policy in an extensible manner.)

CNRs, such as CNR 32A, are described in further detail in U.S. Patent Publication 2022-0279420 A1, published on Sep. 1, 2022, entitled "CONTAINERIZED ROUTER WITH VIRTUAL NETWORKING", which is incorporated herein by reference in its entirety.

In the example server 12A of FIG. 1, pod 22A is a virtual network endpoint in one or more virtual networks. Orchestrator 23A may store or otherwise manage configuration data for application deployments that specifies a virtual network and specifies that pod 22A (or the one or more containers therein) is a virtual network endpoint of the virtual network. Orchestrator 2A3 may receive the configuration data from deployment manager 5, a user, operator/administrator, or other machine system, for instance. Additional description of a container orchestration platform, such as orchestrator 23A, adding a virtual network interface to a virtual computing instance such as Pod 22A is found in U.S. Patent Publication No. 2022/0279420, published 1 Sep. 2022 and titled "CONTAINERIZED ROUTER WITH VIRTUAL NETWORKING," which is incorporated by reference herein in its entirety.

Virtual router agent 21A may create virtual network interfaces 34 ("VIFs 34") that bind interfaces 33 to virtual router 21A. When server 12A brings up physical interfaces 33, such as after server 12A is restarted, virtual router 21A may bind VIFs 34, which are not visible to kernel 80 of the host operating system, to corresponding physical interfaces 33. VIFs 34 may be DPDK interfaces, and each of VIFs 34 may connect to one or more corresponding physical interfaces 33. VIFs 34 are also known as "DPDK ports" or "fabric interfaces."

Interface database 47 includes a list of physical interface types and corresponding VIF configuration profiles with which VIFs 34 may be configured. Each profile may specify configuration parameters with which vRouter 21A may configure a VIF 34 for communication with a corresponding physical interface 33. Such configuration parameters may include, e.g., a transmission rate to be used by the VIF, a Maximum Transmission Unit (MTU) to be used by the VIF, a bandwidth to be used by the VIF, resources to be allocated or used by the VIF, one or more communication or networking protocols, performance requirements or specifications, etc. In some examples, the VIF configuration profiles may be indexed according to different capabilities or hardware attributes of the physical interfaces. In some examples, the VIF configuration profiles may be indexed by a make identifier, a sub-version identifier, or a revision identifier of various different physical interfaces. Interface database 47 may include specific VIF configuration profiles for each of physical interfaces 33 or NICs 13A, 13B, as well as VIF configuration profiles for other types of physical interfaces or NICs not presently installed, but supported, by server 12A. For example, a VIF configuration profile corresponding to a physical interface that supports DDP may enable the use of a corresponding NIC to perform hardware-based load-balancing of network traffic in accordance with DDP techniques. In contrast, a VIF profile corresponding to a physical interface that does not support DDP may enable software-based load-balancing of network traffic by vRouter 21A.

As discussed above, a single server, such as server 12A, may have multiple NICs 13 having different makes, models, and versions, each providing various different types of interfaces with different software-based or hardware-based capabilities. Some NICs support the use of DDP, and some do not. Conventionally, if a server includes a mixture of NICs of different types, features such as DDP must be disabled unless all of the interfaces support the same features. It is desirable to enable the use of DDP on those interfaces that support DDP so as to take advantage of the hardware-based load balancing techniques provided by DDP. In contrast, where an interface does not support DDP, such interfaces may rely on software-based load balancing techniques provided by the DPDK data plane of virtual router 21A. The techniques of the disclosure enable the use of certain software-based or hardware-based capabilities on a per-interface basis. For example, the techniques of the disclosure enable the use of DDP on interfaces of a single server 12A that support DDP, while disabling the use of DDP on other interfaces of the same server 12A that no not support DDP.

For example, in accordance with the techniques of the disclosure, deployer 61 of CNR 32A of server 12A configures individual VIFs 34 of vRouter 21A for communication with individual physical interfaces 33 of NICs 13A, 13B according to hardware attributes of the corresponding physical interface 33 of NICs 13A, 13B, so as to enable CNR 32A to take advantage of the capabilities of different types of physical interfaces 33 of NICs 13A, 13B of server 12A. In the example of FIG. 1, for ease of illustration, deployer 61 is depicted as functionality of CNR 32A that is separate from vRouter 21A. However, in other examples, deployer 61 may be functionality of vRouter 21A (e.g., such as operations or functionality attributed to a data plane of CNR 32A). In still additional examples, deployer 61 may be functionality of cRPD 25A (e.g., such as operations or functionality attributed to a control plane of CNR 32A). In yet further examples, deployer 61 may be functionality provided by an application executed by server 12A that is separate from both CNR 32A and vRouter 21A.

For example, as described above, server 12A includes multiple NICs 13A, 13B, each of which include one or more hardware-based physical interfaces 33. Each of physical interfaces 33 may have one or more hardware attributes. Some of physical interfaces 33 may have attributes that are the same as one another, while some of physical interfaces 33 may have attributes that are different from one another. For example, a first physical interface 33 may support DDP, while a second physical interface 33 may not support DDP. In addition, physical interfaces may support different sizes of MTU, different throughputs, different protocols, etc. As another example, a first NIC of NICs 13 may be a Smart NIC, a second NIC of NICs 13 may be a load-balancing NIC, and a third NIC may be a speed-optimized NIC. Each of these NICs 13 may include various physical interfaces 33 of different types and capabilities.

For each physical interface 33, deployer 61 obtains information specifying one or more hardware attributes of the hardware-based physical interface 33. Deployer 61 obtains, from interface database 47 and based at least in part on the respective hardware attributes of the physical interface 33, a configuration profile specifying a configuration for a VIF 34 corresponding to the physical interface 33. In some examples, the information specifying one or more hardware attributes indicate, e.g., that a first interface 33A of NIC 13A has a DDP capability, while a second interface 33N of NIC 13B does not have a DDP capability.

Deployer 61 configures each VIF 34 with the configuration specified by the configuration profile to perform forwarding of network traffic to the respective physical interface 33. For example, deployer 61 configures a first VIF 34 for communication with physical interface 33A of NIC 13A, and further configures NIC 13A to perform hardware-based load-balancing of network traffic forwarded via physical interface 33A in accordance with DDP. Further, deployer 61 configures a second VIF 34 for communication with physical interface 33N of NIC 13B. Additionally, deployer 61 configures vRouter 21A to perform software-based load-balancing of network traffic forwarded via physical interface 33N of NIC 13B.

In some examples, deployer 61 configures each VIF 34 associated with a corresponding physical interface 33 with a respective configuration so as to perform load balancing of the network traffic forwarded by server 12A, in totality, across the corresponding physical interfaces. For example, using the techniques set forth herein, deployer 61 may configure vRouter 21A to perform load balancing of the network traffic so as to achieve substantially similar network performance by each of physical interfaces 33, despite physical interfaces 33 having different hardware attribute values, technical capabilities, or features. For example, deployer 61 may configure NIC 13A to perform hardware-based load-balancing of network traffic forwarded via physical interface 33A in accordance with DDP, while deployer 61 may configure vRouter 21A to perform software-based load-balancing of network traffic forwarded via physical interface 33N of NIC 13B, such that network traffic is distributed according to the capabilities of physical interface 33A and physical interface 33N to as to improve network throughput and efficiency. In some examples, the output of network traffic is evenly balanced or evenly distributed between physical interface 33A and physical interface 33N. In other examples, the output of network traffic is balanced or distributed between physical interface 33A and physical interface 33N by a proportion, ratio, or percentage according to the respective capabilities of physical interface 33A and physical interface 33N, which may be similar to or different from one another.

Figure 2:
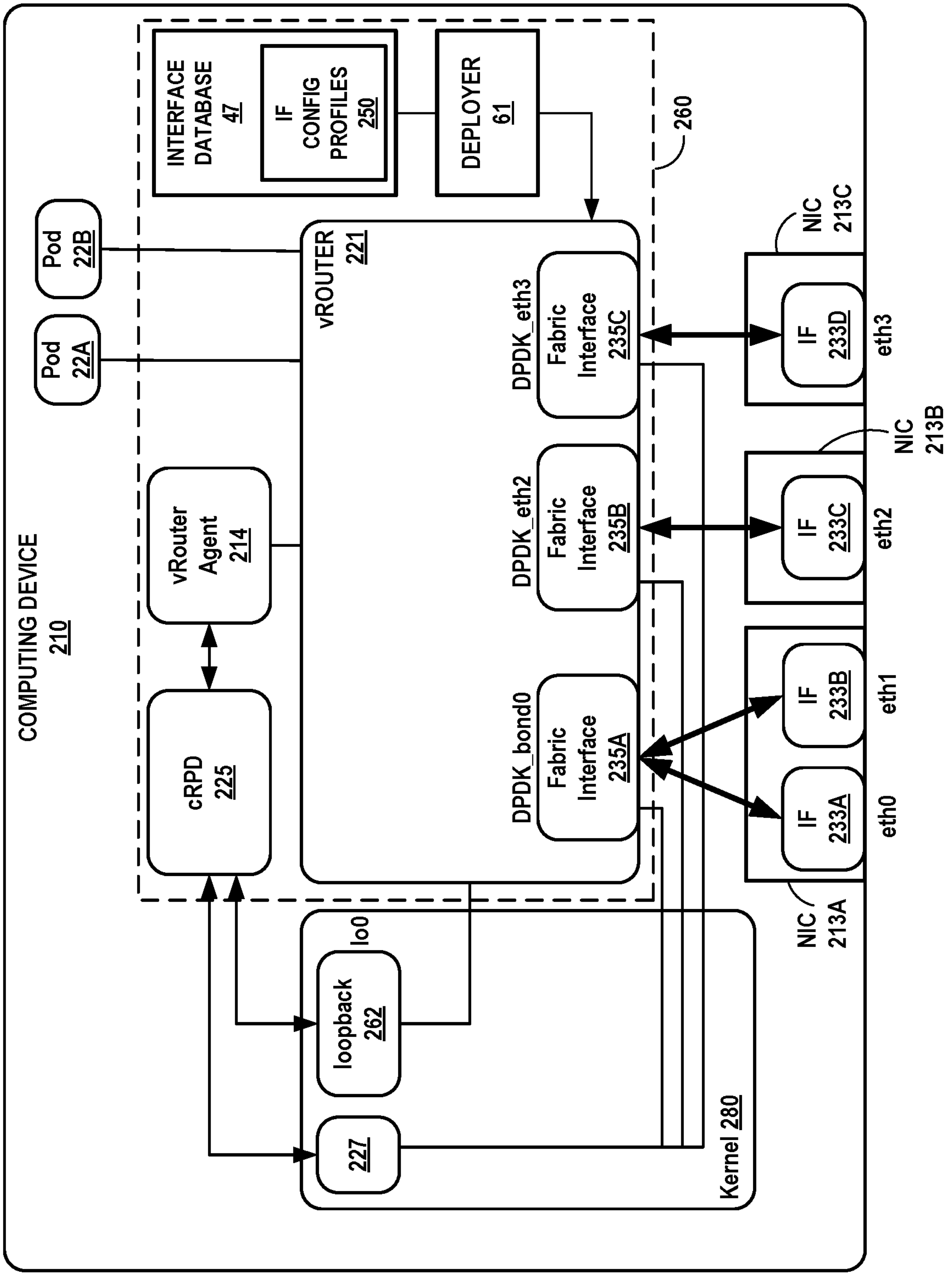
FIG. 2 is a block diagram illustrating an example computing device in accordance with the techniques of the disclosure.

FIG. 2 is a block diagram illustrating example computing device 210 in accordance with the techniques of the disclosure. As shown in FIG. 2, computing device 210 is an example of server 12A of FIG. 1 and includes cRPD 225, which is an example of cRPD 25A of FIG. 1, virtual router agent 214 (illustrated as "vrouter agent 214"), and virtual router 221, which is an example of virtual router 21A of FIG. 1. Computing device 200 also includes NICs 213A-213C (collectively, "NICs 213") that include interfaces 233A-233D ("interfaces 233"), which are hardware-based, physical interfaces and are examples of physical interfaces 33 of FIG. 1. In the example of FIG. 2, interfaces 233A-233D are named eth0, eth1, eth2, and eth3, respectively. Collectively, cRPD 225, virtual router agent 214, and virtual router 221 may be a containerized network router 260, such as CNR 32A of FIG. 1.

Computing device 200 also includes pods 222A and 222B, which may be examples of pods 22 of FIG. 1, and which are connected to virtual router 221 via respective virtual network interfaces, such as DPDK interfaces. Virtual router agent 214 may communicate with virtual router 221 via an interface, pkt0, to send and receive packets. Such packets may include the first packet of a flow or may include control packets (e.g., DHCP, ARP, DNS etc.) used for next-hop resolution functionality, proxy ARP functionality, and the like.

Virtual router agent 214 may also program virtual router 221 with control plane information received from cRPD 225. cRPD 225 and the virtual router agent 214 may communicate via an interface, such as a gRPC Remote Procedure Calls (gRPC) interface, based on information received from orchestrator 23, a management system, or a network controller. For example, cRPD 225 may program VRFs, routes, and next-hops via the interface. Virtual router agent 214 may program virtual router 221 with control plane information received from cRPD 225 using, for instance, TCP transport such as the Sandesh southbound interface protocol connection.

In a DPDK-based deployment of virtual router 221, virtual router 221 is installed as a user space application that is linked to the DPDK library, and virtual router 221 may use poll mode drivers (PMDs) to access physical interfaces 233. The registers of physical interfaces 233 may be exposed into user space in order to be accessible to the PMDs. Physical interfaces 233 are therefore no longer managed by or visible to the host operating system of computing device 200. Instead, virtual router 221 may manage physical interface 233. This includes packet polling, packet processing, and packet forwarding. In other words, user packet processing steps are performed by virtual router 221.

Virtual router agent 214 may create fabric interfaces 235A-235C ("fabric interfaces 235") that bind interfaces 233 to virtual router 221. Fabric interfaces 235 may be examples of VIFs 34 of FIG. 1. When computing device 200 brings up physical interfaces 233, such as after computing device 200 is restarted, virtual router 221 may bind fabric interfaces 235, which are not visible to kernel 280 of the host operating system, to corresponding physical interfaces 233. Fabric interfaces 235 may be DPDK interfaces, such as virtual network interfaces (e.g., vifs), and each of fabric interfaces 235 may connect to one or more corresponding physical interfaces. Fabric interfaces 235 are also known as "DPDK ports."

Each of fabric interfaces 235 may be in a bonded mode or a non-bonded mode. In the example of FIG. 2, fabric interface 235A is a bonded mode and connects to interfaces 233A and 233B. Fabric interface 235B is in a non-bonded mode and connects to interface 233C. Fabric interface 235C is in a non-bonded mode and connects to interface 233D. Virtual router 221 may give each fabric interface the same name as the fabric interface's corresponding physical interface. For example, because fabric interface 235B is bound to physical interface 233C named eth2, virtual router 221 may also give the name eth2 to fabric interface 325B.

Virtual router 221 may therefore use fabric interfaces 235 to send and receive packets via interfaces 233. For example, virtual router 221 may send packets to interface 233C by sending packets to fabric interface 235B. Similarly, virtual router may receive packets received by interface 233D by receiving those packets from fabric interface 235C connected to interface 233D.

Because physical interfaces 233 are no longer managed by or visible to the host operating system of computing device 200, cRPD 225 may not be able to use the networking stack of the host operating system to access interfaces 233 to send and receive packets via interface 233, such as in order to exchange routing information with other routers. Therefore, in some examples, virtual router agent 214 may create tap interfaces 227 that correspond to the physical interfaces 233 and are plumbed into the kernel 280 of the host operating system by virtual router 221. Tap interfaces 227 act as representors of corresponding physical interfaces 233. That is, tap interfaces 227 act as physical interfaces from the point of view of cRPD 225, and cRPD 225 is able to access physical interfaces 233 via tap interfaces 227 to send and receive packets. cRPD 225 may therefore use the networking stack of the host operating system to send and receive packets to and from tap interfaces 227 as if tap interfaces were the physical network interfaces of computing device 200. In some examples, tap interfaces 227 may be virtual network interfaces, such as vifs.

Virtual router agent 214 may create a tap interface for each physical interface and may connect each tap interface to the corresponding physical interface. By connecting a tap interface to a corresponding physical interface, cRPD 225 can transmit packets to a particular tap interface to transmit the packets to the corresponding physical interface. Similarly, cRPD 225 can receive packets from a physical interface by receiving the packets from a corresponding tap interface connected to the physical interface. Virtual router 221 may propagate the up/down state of fabric interfaces 235 to tap interfaces 227. Further, virtual router 221 may propagate the MTU applied to a tap interface to the corresponding fabric interface cross-connected to the tap interface.

cRPD 225 may use tap interfaces 227 for control plane applications, such as sending and receiving protocol packets (e.g., BGP protocol packets, Intermediate System-to-Intermediate System protocol packets, etc.) to exchange routing information with other routers. cRPD 225 can use the networking stack of the host operating system to send packets to tap interfaces 227 in order to transmit the packets via the corresponding physical interfaces 233.

Virtual router 221 may also create tap-loopback interface 262 lo0 to the loopback interface of virtual router 221 having an IP address that is the BGP endpoint. A containerized network router may have a single loopback interface, having an IP address configured in a /32 subnet without a MAC address, that is used as a tunnel endpoint. The loopback interface is the next hop address that BGP may advertise to its peers. Data packets with encapsulations such as MPLS over UDP (MPLSoUDP), MPLS over Generic Routing Encapsulation (MPLSoGRE), and VXLAN may have an outer IP address that is the IP address of the loopback interface. The IP address of the loopback interface may be reachable via any of interfaces 233. cRPD 225 may program the receive next hop for the loopback interface. The loopback interface may therefore replace the vhost0 interface for the containerized network router.

When interfaces 233 receives a packet, virtual router 221 may look up the packet in a forwarding information base (FIB) to determine whether the packet is destined for cRPD 225. If virtual router 221 determines that the packet is destined for cRPD 225, virtual router 221 may send the packet to the tap interface connected to the physical interface that received the packet.

Creating tap interfaces 227 to allow cRPD 225 to send and receive packets via interfaces 233 may enable a variety of different workflows to be performed by a containerized network router. Such workflow include protocol packet handling to and from cRPD 225, transit packet handling between interfaces 233, overlay packet handling as a tunnel endpoint, and the containerized network router working in a gateway mode. Additional information regarding the use of tap interfaces may be found in U.S. patent application Ser. No. 18/621,910, filed Mar. 29, 2024, and titled "MULTIPLE INTERFACE SUPPORT FOR A CONTAINERIZED VIRTUAL ROUTER," which is incorporated by reference herein in its entirety.

Virtual router 221 may read the list of interfaces 233 from agent.conf and may create and bind fabric interfaces 235 to interfaces 233. Virtual router 221 may name each fabric interface in DPDK to be similar to the name of the corresponding physical interface connected to the fabric interface. As described above, fabric interfaces 235 are not visible in kernel 280.

For route updates, cRPD 225 may send the prefix and the name of the interface where the prefix is learnt to virtual router agent 214. Depending on the type of next hop, virtual router agent 214 may program virtual router 221 with the correct vif index corresponding to the interface name. There may be two vifs corresponding to the interface name. For a host/direct route, virtual router agent 214 may program the vif index of the tap interface as the next hop. For a network route or learnt route (e.g., using IGP), virtual router agent 214 may program the vif index of the fabric interface as the next hop. From the perspective of cRPD 225, /32 prefixes may be sent with NH type as receive, and any <32 prefixes may be sent with NH type as resolve.

For route updates, virtual router agent 214 may program receive next hop for direct routes pointing to tap interfaces 227. Virtual router agent 214 may also program receive NH for loopback IP pointing to vhost0, and cRPD 225 may configure the loopback interface. Virtual router agent 214 may also perform ARP and Neighbor Discovery (ND) resolution for next hop. Virtual router agent 214 may program encap NH for underlay routes and may program tunnel NH for overlay routes.

In some examples, the containerized network router may take part in ARP resolution. cRPD 225 may program virtual router 221 with the gateway and the prefix. In this scenario, virtual router agent 214 may resolve the ARP of the gateway as the Encap NH. Virtual router 221 may flood incoming underlay broadcast ARP requests and ARP replies to virtual router agent 214 as well as to physical interfaces 233.

In some examples, the containerized network router may perform Internet Control Message Protocol (ICMP) error handling. Virtual router 221 may receive an ICMP packet and may check to see whether the time to live (TTL) for the packet has expired. If virtual router 221 determines that the TTL for the packet has expired, virtual router 221 may trap the packet to virtual router agent 214, and virtual router agent 214 may respond with an ICMP unreachable message.

In accordance with the techniques of the disclosure, deployer 61 of CNR 260 configures individual fabric interfaces 235 of vRouter 221 for communication with individual physical interfaces 233, according to hardware attributes of the corresponding physical interface 233, so as to enable CNR 260 to take advantage of the capabilities of different types of physical interfaces 233. In the example of FIG. 2, for ease of illustration, deployer 61 is depicted as separate from vRouter 221. However, in other examples, deployer 61 may be functionality of vRouter 221, cRPD 225, or separately provided by another application executed by computing device 210.

For example, each of physical interfaces 233 may have one or more hardware attributes. Some of physical interfaces 233 may have attributes that are the same as one another, while some of physical interfaces 233 may have attributes that are different from one another. For example, physical interface 233A may support DDP, while physical interface 233C may not support DDP. In addition, physical interfaces may support different sizes of MTU, different throughputs, different protocols, etc. As another example, NIC 213A incorporating interfaces 233A and 233B may be a Smart NIC, NIC 213B incorporating interface 233C may be a load-balancing NIC, and NIC 213C incorporating interface 233D may be a speed-optimized NIC. Each of these NICs 213 may include various physical interfaces 233 of different types and capabilities.

For each physical interface 233 employed by computing device 210, deployer 61 obtains information specifying one or more hardware attributes of the physical interfaces 233. For example, deployer 61 may obtain, from each NIC 213 of computing device 210, a make identifier, a sub-version identifier, or a revision identifier of the NIC 213. In some examples, the information specifying one or more hardware attributes indicate, e.g., that interface 233C has a DDP capability, while a second interface 233D does not have a DDP capability.

For each physical interface 233, deployer 61 obtains, from interface database 47 and based at least in part on the respective hardware attributes of the physical interface 233, an interface configuration profile from interface configuration profiles 250 specifying a configuration for a fabric interface 235 corresponding to the physical interface 233. For example, deployer 61 may provide the make identifier, sub-version identifier, or revision identifier of the NIC to interface database 47 and retrieve a corresponding interface configuration profile 250. As another example, deployer 61 may provide an indication of a DDP capability or incapability of an interface 233, and retrieve an interface configuration profile that enables or disables DDP capability or incapability, respectively, for a fabric interface 235 corresponding to the physical interface 233.

Deployer 61 configures each fabric interface 235 with the configuration specified by the configuration profile 270 to perform forwarding of network traffic to the respective physical interface 233. As an example, physical interface 233C supports DDP while physical interface 233D does not support DDP. Deployer 61 configures fabric interface 235B for communication with physical interface 233C, and further configures NIC 213B incorporating interface 233C to perform hardware-based load-balancing of network traffic forwarded via physical interface 233C in accordance with DDP. Further, deployer 61 configures a fabric interface 235C for communication with physical interface 233D. Additionally, deployer 61 configures vRouter 221 to perform software-based load-balancing of network traffic forwarded via physical interface 233D of NIC 213C.

Figure 3:
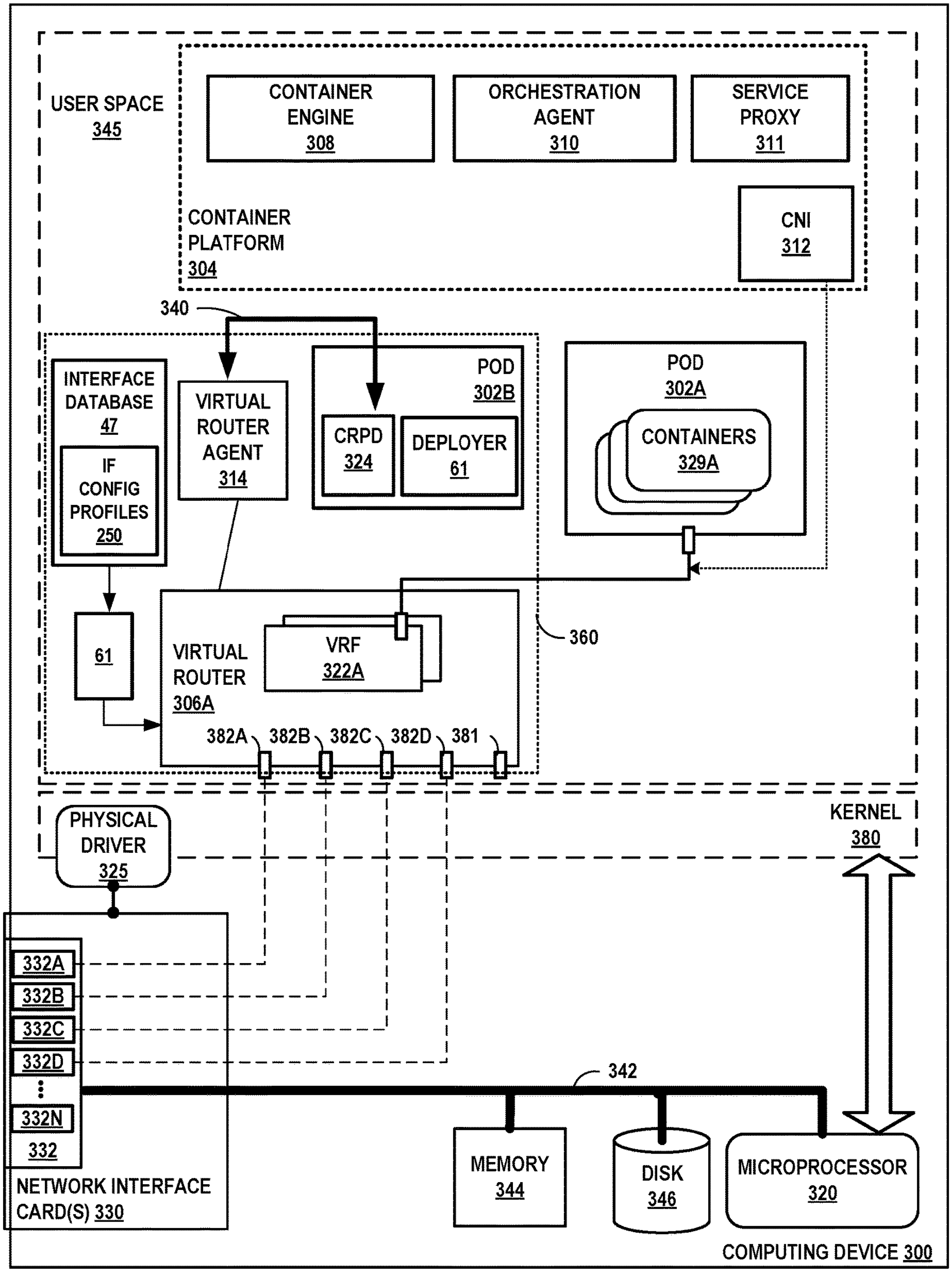
FIG. 3 is a block diagram of an example computing device, (e.g., host), according to techniques described in this disclosure

FIG. 3 is a block diagram of an example computing device, (e.g., host), according to techniques described in this disclosure. Computing device 300 of FIG. 3 may represent a physical or virtual server and may represent an example instance of any of servers 12 of FIG. 1. Computing device 300 includes in this example, a bus 342 coupling hardware components of a computing device 300 hardware environment. Bus 342 couples network interface controller (NIC) 330, storage disk 346, and one or more microprocessors 320 (hereinafter, "microprocessor 320"). NIC 330 may be SR-IOV-capable. A front-side bus may in some cases couple microprocessor 320 and memory device 344. In some examples, bus 342 may couple memory device 344, microprocessor 320, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 320 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 320.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface controller(s) (NIC) 330 include a plurality of interfaces 332A-223N (collectively, "interfaces 332") configured to exchange packets using links of an underlying physical network. In some examples, a network interface controller may be a physical card, e.g., a network interface card. Interfaces 332 may include a port interface controller having a plurality of network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 320 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 345.

Kernel 380 includes a physical driver 325 to use the network interface controller 330. Network interface controller 330 may also implement SR-IOV to enable sharing the physical network function (I/O) among one or more virtual execution elements, such as containers 329A-329B or one or more virtual machines (not shown in FIG. 3). Shared virtual devices such as virtual functions may provide dedicated resources such that each of the virtual execution elements may access dedicated resources of NIC 330, which therefore appears to each of the virtual execution elements as a dedicated NIC. Virtual functions may represent lightweight PCIe functions that share physical resources with a physical function used by physical driver 325 and with other virtual functions. For an SR-IOV-capable NIC 330, NIC 330 may have thousands of available virtual functions according to the SR-IOV standard, but for I/O-intensive applications the number of configured virtual functions is typically much smaller.

Computing device 300 may be coupled to a physical network switch fabric that includes an overlay network that extends switch fabric from physical switches to software or "virtual" routers of physical servers coupled to the switch fabric, including virtual router 306A. Virtual routers may be processes or threads, or a component thereof, executed by the physical servers, e.g., servers 12 of FIG. 1, that dynamically create and manage one or more virtual networks, which may include VPCs, usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In some examples, virtual router 306A, together with cRPD 324, virtual router agent 314, and interface database 47, may form CNR 360. CNR 360 may be an example of CNR 32A of FIG. 1 or CNR 260 of FIG. 2.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing. In some examples, virtual router 306A may perform routing of packets to/from one or more VPCs.

Virtual router 306A can be executing as a kernel module or as a user space DPDK process (virtual router 306A is shown here in user space 345). Virtual router agent 314 may also be executing in user space. In the example computing device 300 of FIG. 3, virtual router 306A executes within user space as a DPDK-based virtual router, but virtual router 306A may execute within a hypervisor, a host operating system, a host application, or a virtual machine in various implementations. In some examples, virtual router agent 314 has a connection to a separate network controller using a channel, which is used to download configurations and forwarding information. Virtual router agent 314 programs forwarding information to the virtual router data (or "forwarding") plane represented by virtual router 306A. Virtual router 306A and virtual router agent 314 may be processes.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing.

Virtual router 306A may be multi-threaded and execute on one or more processor cores. Virtual router 306A may include multiple queues. Virtual router 306A may implement a packet processing pipeline. The pipeline can be stitched by the virtual router agent 314 from the simplest to the most complicated manner depending on the operations to be applied to a packet. Virtual router 306A may maintain multiple instances of forwarding bases. Virtual router 306A may access and update tables using RCU (Read Copy Update) locks.

To send packets to other compute nodes or switches, virtual router 306A uses physical interfaces 332A-332D ("physical interfaces 332"). In general, virtual router 306A exchanges packets with workloads such as pods, VMs, worker nodes, and the like. For example, virtual router 306A may exchange packets with workloads via one or more of VPCs connected via physical interfaces 332. In some examples, virtual router 306A has multiple virtual network interfaces (e.g., vifs). These interfaces may include an interface to the underlay NIC 330 (vif 0/0)—a Linux bond interface in some examples; a kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 332.

In a kernel-based deployment of virtual router 306A (not shown), virtual router 306A is installed as a kernel module inside the operating system. Virtual router 306A registers itself with the TCP/IP stack to receive packets from any of the desired operating system interfaces that it wants to. The interfaces can be bond, physical, tap (for VMs), veth (for containers) etc. Virtual router 306A in this mode relies on the operating system to send and receive packets from different interfaces. For example, the operating system may expose a tap interface backed by a vhost-net driver to communicate with VMs. Once virtual router 306A registers for packets from this tap interface, the TCP/IP stack sends all the packets to it. Virtual router 306A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 306A, virtual router 306A is installed as a user space 345 application that is linked to the DPDK library. This may lead to faster performance than a kernel-based deployment, particularly in the presence of high packet rates. The physical interfaces 332 are used by the poll mode drivers (PMDs) of DPDK rather the kernel's interrupt-based drivers. The registers of physical interfaces 332 may be exposed into user space 345 in order to be accessible to the PMDs; physical interfaces 332 bound in this way is no longer managed by or visible to the host operating system, and the DPDK-based virtual router 306A manages the physical interface 332. This includes packet polling, packet processing, and packet forwarding. In other words, user packet processing steps are performed by the virtual router 306A DPDK data plane. The nature of this "polling mode" makes the virtual router 306A DPDK data plane packet processing/forwarding much more efficient as compared to the interrupt mode when the packet rate is high. There are comparatively few interrupts and context switching during packet I/O, compared to kernel-mode virtual router 306A, and interrupt and context switching during packet I/O may in some cases be avoided altogether.

Virtual router 306A uses fabric interfaces 382A-382D ("fabric interfaces 382") that bind respective physical interfaces 332 to virtual router 306A in order to send and receive packets via physical interfaces 332. Each fabric interface may be bound to a particular interface. For example, fabric interface 382A may be bound to physical interface 332A. In some examples, a fabric interface may be in bonded mode to connect to multiple physical interfaces. Each of virtual network interfaces 235 may be a tap interface, DPDK interface, such as a virtual network interface (e.g., vif), Unix domain socket, virtio interface, veth interface, macvlan, another type of interface, or a combination of types of interfaces. Virtual router 306A may also have loopback interface 381 that replaces the vhost0 interface for the CNR. Loopback interface 381 may be used as a tunnel endpoint. The IP address of loopback interface 381 may be reachable via any of physical interfaces 332.

In general, each of pods 302A-302B may be assigned one or more virtual network addresses for use within respective virtual networks, where each of the virtual networks may be associated with a different virtual subnet provided by virtual router 306A. Pod 302B may be assigned its own virtual layer three (L3) IP address, for example, for sending and receiving communications but may be unaware of an IP address of the computing device 300 on which the pod 302B executes. The virtual network address may thus differ from the logical address for the underlying, physical computer system, e.g., computing device 300.

Computing device 300 includes a virtual router agent 314 that controls the overlay of virtual networks for computing device 300 and that coordinates the routing of data packets within computing device 300. Orchestrator 23 may communicate with virtual router agent 314 in some examples to configure virtual router 306A. In some examples, virtual router agent 314 may communicate with a network controller or management system for the virtualization infrastructure, which generates commands to create virtual networks and configure network virtualization endpoints, such as computing device 300 and, more specifically, virtual router 306A, as a well as a virtual network interface between virtual router 306A and pod 302A. By configuring virtual router 306A based on information received, virtual router agent 314 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 329A within the virtual network domains may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 306A. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 306A may tunnel encapsulation/decapsulation for packets sourced by/destined to any containers of pods 302.

Virtual router 306A implements one or more virtual routing and forwarding instances (VRFs), such as VRF 322A, for respective virtual networks for which virtual router 306A operates as respective tunnel endpoints. In general, each VRF 322 stores forwarding information for the corresponding virtual network or a VPC and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network. For example, virtual router 306A may learn routes from cRPD 324 via virtual router agent 314, which may include an API, and use such learned routes to construct a forwarding table for each VRF 322.

CRPD 324 acts as a control plane for virtual router 306A. In some examples, cRPD 324 may learn BGP routes of packets flowing through computing device 300 and may program route tables for virtual routers 306 (e.g., via virtual router agent 314).

In some examples, cRPD 324 may perform routing processes that executes various network protocols at different layers (e.g., layer 2, layer 3, etc.) of a networking stack, and may exchange routing protocol messages with other routers. Such network protocols may include IS-IS, OSPF, BGP, Internet Group Management Protocol (IGMP), MPLS, and/or other interior or exterior routing protocols.

NIC 330 may receive tunnel packets. Virtual router 306A processes the tunnel packet to determine, from the tunnel encapsulation header, the virtual network of the source and destination endpoints for the inner packet. Virtual router 306A may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to one of VRFs 322A. The VRF may include forwarding information for the inner packet. For instance, the VRF may map a destination layer 3 (L3) address for the inner packet to a virtual network interface for a pod (e.g., pod 302A). The VRF forwards the inner packet via the virtual network interface to the pod in response.

Containers 329 may also source inner packets as source virtual network endpoints. Container 329A, for instance, may generate a layer 3 inner packet destined for a destination virtual network endpoint that is executed by another computing device (i.e., not computing device 300) or for another one of containers 329. Container 329A may send the layer 3 inner packet to virtual router 306A via a virtual network interface.

Virtual router 306A receives the inner packet and layer 2 header and determines a virtual network for the inner packet. Virtual router 306A may determine the virtual network using any of the above-described virtual network interface implementation techniques (e.g., macvlan, veth, etc.). Virtual router 306A uses the VRF 322A corresponding to the virtual network for the inner packet to generate an outer header for the inner packet, the outer header including an outer IP header for the overlay tunnel and a tunnel encapsulation header identifying the virtual network. Virtual router 306A encapsulates the inner packet with the outer header. Virtual router 306A may encapsulate the tunnel packet with a new layer 2 header having a destination layer 2 (L2) address associated with a device external to the computing device 300, e.g., a TOR switch 16 or one of servers 12. If external to computing device 300, virtual router 306A outputs the tunnel packet with the new layer 2 header to NIC 330. NIC 330 outputs the packet on an outbound interface. If the destination is another virtual network endpoint executing on computing device 300, virtual router 306A routes the packet to the appropriate virtual network interface.

In some examples, a controller for computing device 300, management system, or an orchestrator configures a default route in each of pods 302 to cause the pods to use virtual router 306A as an initial next hop for outbound packets. In some examples, NIC 330 is configured with one or more forwarding rules to cause all packets received from the pods to be switched to virtual router 306A.

Pod 302A includes one or more application containers 329A. Pod 302B includes an instance of cRPD 324. Container platform 304 includes container engine 308, orchestration agent 310, service proxy 311, and CNI 312.

Container engine 308 includes code executable by microprocessor 320. Container engine 308 may be one or more computer processes. Container engine 308 runs containerized applications in the form of containers 329A-329B. Container engine 308 may represent a Dockert, rkt, or other container engine for managing containers. In general, container engine 308 receives requests and manages objects such as images, containers, networks, and volumes. An image is a template with instructions for creating a container. A container is an executable instance of an image. Based on directives from orchestration agent 310, container engine 308 may obtain images and instantiate them as executable containers in pods 302A-302B.

Service proxy 311 includes code executable by microprocessor 320. Service proxy 311 may be one or more computer processes. Service proxy 311 monitors for the addition and removal of service and endpoints objects, and it maintains the network configuration of the computing device 300 to ensure communication among pods and containers, e.g., using services. Service proxy 311 may also manage iptables to capture traffic to a service's virtual IP address and port and redirect the traffic to the proxy port that proxies a backed pod. Service proxy 311 may represent a kube-proxy for a minion node of a Kubernetes cluster. In some examples, container platform 304 does not include a service proxy 311 or the service proxy 311 is disabled in favor of configuration of virtual router 306A and pods 302 by CNI 312.

Orchestration agent 310 includes code executable by microprocessor 320. Orchestration agent 310 may be one or more computer processes. Orchestration agent 310 may represent a kubelet for a minion node of a Kubernetes cluster. Orchestration agent 310 is an agent of an orchestrator, e.g., orchestrator 23 of FIG. 1, that receives container specification data for containers and ensures the containers execute by computing device 300. Container specification data may be in the form of a manifest file sent to orchestration agent 310 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 302 of containers 329. Based on the container specification data, orchestration agent 310 directs container engine 308 to obtain and instantiate the container images for containers 329, for execution of containers 329 by computing device 300.

Orchestration agent 310 instantiates or otherwise invokes CNI 312 to configure one or more virtual network interfaces for each of pods 302. For example, orchestration agent 310 receives a container specification data for pod 302A and directs container engine 308 to create the pod 302A with containers 329A based on the container specification data for pod 302A. Orchestration agent 310 also invokes the CNI 312 to configure, for pod 302A, virtual network interface for a virtual network corresponding to VRFs 322A. In this example, pod 302A is a virtual network endpoints for a virtual network corresponding to VRF 322A.

CNI 312 may obtain interface configuration data for configuring virtual network interfaces for pods 302. Virtual router agent 314 may operate as a virtual network control plane module for enabling configuration of virtual router 306A by orchestrator 23, a management system, or a network controller such as an SDN controller. Virtual router agent 314 receives and communicates, to CNI 312, interface configuration data for virtual network interfaces to enable an orchestration control plane element (i.e., CNI 312) to configure the virtual network interfaces according to the interface configuration data. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

In accordance with the techniques of the disclosure, deployer 61 of CNR 360 configures individual fabric interfaces 382 of vRouter 306A for communication with individual physical interfaces 332, according to hardware attributes of the corresponding physical interface 332, so as to enable CNR 360 to take advantage of the capabilities of different types of physical interfaces 332. In the example of FIG. 3, for ease of illustration, deployer 61 is depicted as separate from vRouter 306A. However, in other examples, deployer 61 may be functionality of vRouter 306A, or alternatively, functionality of cRPD 324 or another application executed by computing device 300.

For example, each of physical interfaces 332 may have one or more hardware attributes. Some of physical interfaces 332 may have attributes that are the same as one another, while some of physical interfaces 332 may have attributes that are different from one another. For example, physical interface 332A may support DDP, while physical interface 332B may not support DDP. In addition, physical interfaces may support different sizes of MTU, different throughputs, different protocols, etc. As another example, a first NIC 330 incorporating interface 332A may be a Smart NIC, a second NIC 330 incorporating interface 332B may be a load-balancing NIC, and a third NIC 330 incorporating interface 332C may be a speed-optimized NIC. Each of these NICs 330 may include various physical interfaces 332 of different types and capabilities.

For each physical interface 332 employed by computing device 300, deployer 61 obtains information specifying one or more hardware attributes of the physical interfaces 332. In some examples, deployer 61 obtains information specifying one or more hardware attributes of the physical interfaces 332 from a NIC incorporating each respective physical interface 332. In some examples, deployer 61 obtains information specifying one or more hardware attributes of the physical interfaces 332 from a request to an application executing within user space 345 or an application executing within kernel 380. In some examples, deployer 61 receives the information specifying the hardware attributes of the physical interfaces 332 in the form of a Helm chart specifying the one or more hardware attributes.

In some examples, the information specifying the one or more hardware attributes comprises a make identifier, a sub-version identifier, or a revision identifier of a NIC 330 incorporating the respective interface 332. In some examples, the information specifying the one or more hardware attributes indicate a DDP capability or incapability of the respective interface 332. For illustration, with respect to the example of FIG. 3, interface 332C has a DDP capability, while a second interface 332D does not have a DDP capability. In some examples, the information specifying the one or more hardware attributes indicate one or more of a transmission rate, an MTU, a processor type, or an amount of memory of a NIC 330 comprising the respective physical interface 332. In some examples, the information specifying one or more hardware attributes indicate whether the respective physical interface is a single interface or a bonded (e.g., aggregate) interface.

For each physical interface 332, deployer 61 obtains, from interface database 47 and based at least in part on the respective hardware attributes of the physical interface 332, an interface configuration profile (from interface configuration profiles 250) specifying a configuration for a fabric interface 382 corresponding to the physical interface 332. In some examples, deployer 61 provides a query to interface database 47 that includes the information specifying one or more hardware attributes, and receives, from interface database 47, an interface configuration profile specifying a configuration for a fabric interface 382 responsive to the query. For example, deployer 61 may provide the make identifier, sub-version identifier, or revision identifier of the NIC to interface database 47 and retrieve a corresponding interface configuration profile. As another example, deployer 61 may provide an indication of a DDP capability or incapability of an interface 332, and retrieve an interface configuration profile that enables or disables DDP capability or incapability, respectively, for a fabric interface 382 corresponding to the physical interface 332.

In some examples, interface database 47 may not include a specific interface configuration profile for a given physical interface 332. In such a situation, interface database 47 may select an interface configuration profile that is a "best fit" for the given physical interface 332. For example interface database 47 may select an interface configuration profile that most closely matches the one or more hardware attributes of the physical interface 332 in comparison to other available interface configuration profile. Alternatively, interface database 47 may provide a default interface configuration profile for a given interface 332 where the database does not include a configuration specific to the interface 332.

Deployer 61 configures each fabric interface 382 with the configuration specified by the configuration profile 270 to perform forwarding of network traffic to the respective physical interface 332. With reference to the foregoing example, physical interface 332A supports DDP while physical interface 332B does not support DDP. Deployer 61 configures fabric interface 382A for communication with physical interface 332A, and further configures a first NIC 330 incorporating interface 332A to perform hardware-based load-balancing of network traffic forwarded via physical interface 332A in accordance with DDP. Further, deployer 61 configures a fabric interface 382B for communication with physical interface 332B. Additionally, deployer 61 configures vRouter 306A to perform software-based load-balancing of network traffic forwarded via physical interface 332B.

Figure 4:
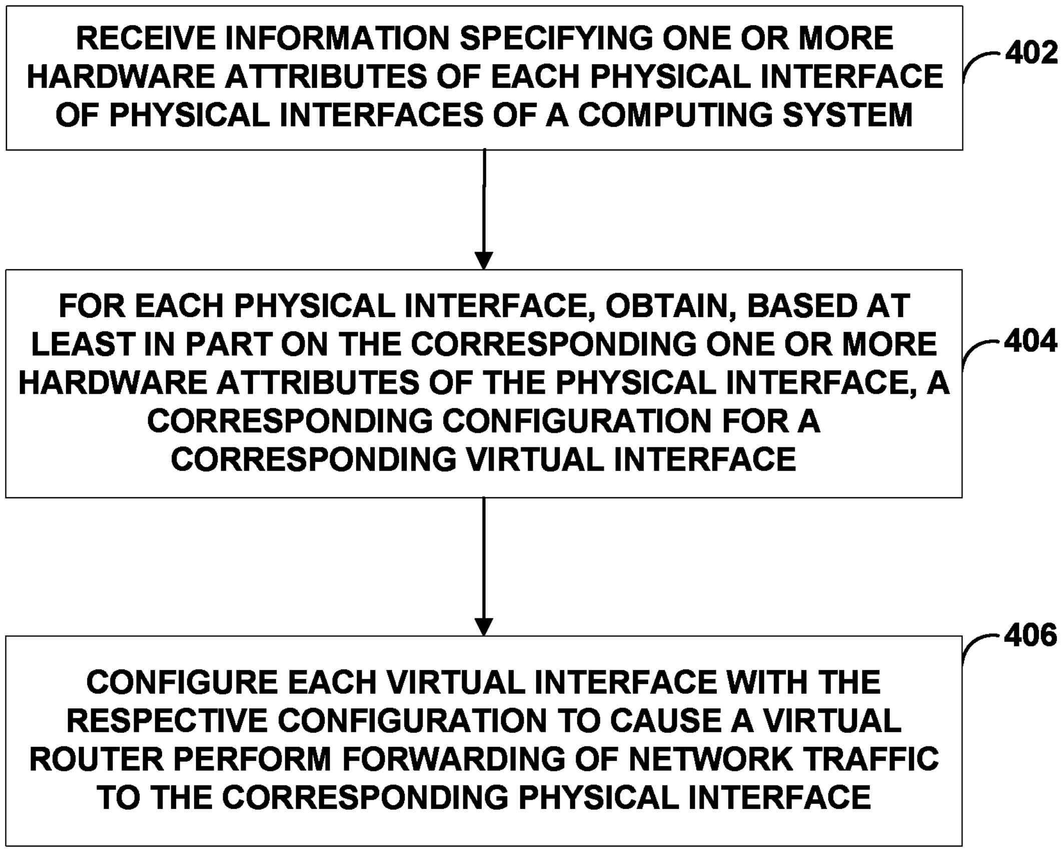
FIG. 4 is a flowchart illustrating an example operation in accordance with the techniques of the disclosure.

FIG. 4 is a flowchart illustrating an example operation in accordance with the techniques of the disclosure. FIG. 4 is described with respect to server 12A of FIG. 1 for convenience. However, in some examples, the operation of FIG. 4 may also be performed by computing device 210 of FIG. 2 or computing device 300 of FIG. 3.

For each physical interface 33, deployer 61 receives information specifying one or more hardware attributes of each physical interface 33 of hardware-based physical interfaces 33 of server 12A (402). In some examples, deployer 61 obtains the information specifying the one or more hardware attributes of each of physical interfaces 33 from a corresponding NIC 13 incorporating the corresponding physical interface 33 or an application executing within kernel 380 (e.g., an operating system of server 12A). In some examples, the information specifying the hardware attributes of the physical interfaces 33 is in the form of a Helm chart.

In some examples, the information specifying the one or more hardware attributes comprises a make identifier, a sub-version identifier, or a revision identifier of a NIC 13 incorporating the respective physical interface 33. In some examples, the information specifying the one or more hardware attributes indicate a DDP capability or incapability of the respective physical interface 33. In some examples, the information specifying the one or more hardware attributes indicate one or more of a transmission rate, an MTU, a processor type, or an amount of memory of a NIC 13 incorporating the respective physical interface 33. In some examples, the information specifying one or more hardware attributes indicate whether the respective physical interface is a single interface or a bonded (e.g., aggregate) interface.

For each physical interface 33, deployer 61 obtains, based at least in part on the respective hardware attributes of the physical interface 33, a corresponding configuration for a VIF 34 corresponding to the physical interface 33 (404). In some examples, deployer 61 obtains the configuration for each VIF 34 from a database, such as interface database 47 of FIG. 1. In some examples, deployer 61 obtains an interface configuration profile for the VIF 34. The interface configuration profile may specify one or more configuration parameters with which the VIF 34 is to be configured. Such configuration parameters may include, e.g., a transmission rate to be used by the VIF 34, a Maximum Transmission Unit (MTU) to be used by the VIF 34, a bandwidth to be used by the VIF 34, resources to be allocated or used by the VIF 34, one or more communication or networking protocols, performance requirements or specifications, etc.

Deployer 61 configures each VIF 34 with the corresponding configuration to cause vRouter 21A to perform forwarding of network traffic to the corresponding physical interface 33 (406). For example, physical interface 33A supports DDP, while physical interface 33N does not support DDP. In this example, deployer 61 configures a first VIF 34 for communication with physical interface 33A of NIC 13A, and further configures NIC 13A to perform hardware-based load-balancing of network traffic forwarded via physical interface 33A in accordance with DDP. Further, deployer 61 configures a second VIF 34 for communication with physical interface 33N of NIC 13B. Additionally, deployer 61 configures vRouter 21A to perform software-based load-balancing of network traffic forwarded via physical interface 33N of NIC 13B.

Figure 5:
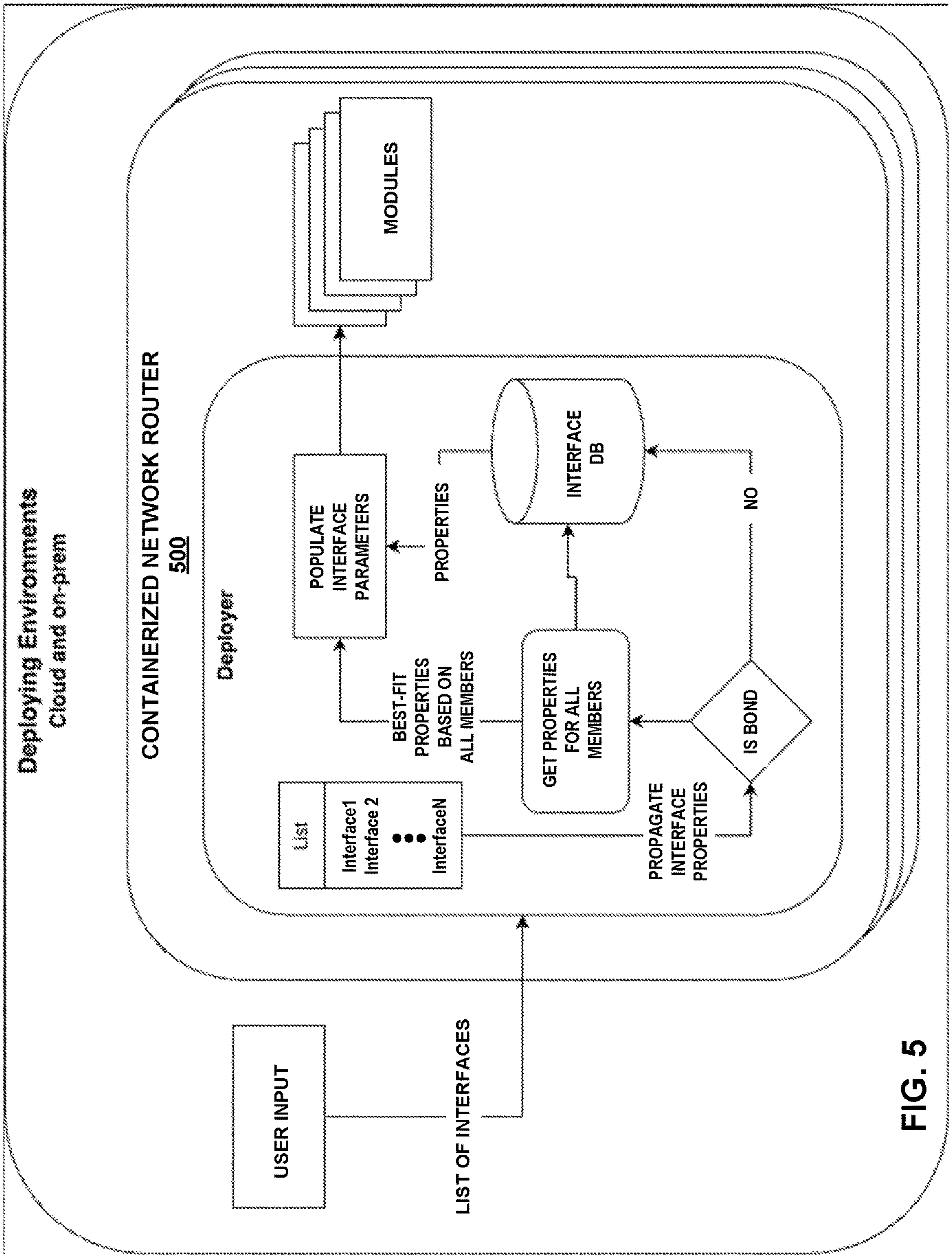
FIG. 5 is a block diagram illustrating an example containerized network router in accordance with the techniques of the disclosure.

FIG. 5 is a block diagram illustrating an example containerized network router 500 in accordance with the techniques of the disclosure. A containerized network router, such as the Cloud Native Router offered by Juniper Networks, Inc., provides routing and/or switching functionality on various deployment modes. One of the deployment modes is on-premises deployment, where the containerized network router runs on a bare-metal x86 server with a NIC such as that offered by Intel Corp.

DDP is a technology that enables programmable packet processing pipelines provided by Intel Corp. as a profile to their NICs. One of the examples of DDP usage is packet classification, where the containerized network router applies profiles to the NIC to classify multiple packet formats on the NIC, thereby enabling speeds and feeds to the application, such as DPDK. This technology is supported by multiple NICs provided by Intel Corp., but support varies based on the type of NIC. Some of these NICs support DDP and some of them do not support this functionality.

Containerized network router 500, as depicted in the example of FIG. 5, supports interfaces from different NIC cards. This means, containerized network router 500 may associate a first virtual interface with a first physical interface of a first NIC that supports DDP and associate a second virtual interface with a second physical interface of a second NIC that does not support DDP. Enabling DDP on a per-interface basis becomes highly desirable in such scenarios.

Containerized network router 500, operating in accordance with the techniques of the disclosure, may provide for the following functionality:

A new configuration option for DDP called "auto." When DDP is set to "auto," containerized network router 500 checks if a NIC supports DDP and configures DPDK accordingly. Detecting whether a NIC supports DDP at run time makes the deployment of containerized network routers in volume easier.

A new per-interface DDP configuration is defined. This configuration options overrides any global DDP configuration for the corresponding interface.

Support for a global option along with the new per-interface option.

DDP configuration in Helm charts (both global and per-interface) are optional to configure. The default value is typically used.

A default value for DDP may be "off." This is to satisfy existing deployments by keeping the defaults same across upgrades. The "auto" option may make subsequent upgrades and support more smooth.

Containerized network router 500 may use the features described herein while operating in L2 mode, L3 mode or L2-L3 mode.

In some examples, DDP is configured on a per-interface basis in Helm charts. There may be three options:

1. Auto: When set, containerized network router 500 detects if hardware supports DDP and takes an appropriate action.
2. On: This option enables DDP on a configured interface without hardware validation. This may be used with new NIC development, or if a NIC is known to support DDP.
3. Off: This is the default option and disable DDP on the configured interface.

No configuration is expected on the cloud Routing Protocol Daemon (cRPD)/control plane side. DDP is an interface configuration. Different interfaces can have different configuration options as described above for DDP.

While in the foregoing examples, options with respect to DDP are described, in some examples, the techniques of the disclosure may be applied to hardware attributes, features, or technical capabilities of NICs or physical interfaces other than DDP alone. For example, the techniques of the disclosure may enable containerized network router 500 to configure virtual interfaces on a per-physical interface basis based at least in part on hardware attributes of physical interfaces such as a transmission rate, a Maximum Transmission Unit (MTU), a processor type, or an amount of memory of a NIC comprising the respective physical interface. In some examples, the techniques of the disclosure may enable containerized network router 500 to configure virtual interfaces on a per-physical interface basis based at least in part on whether the NIC to which a physical interface corresponding to each virtual interface belongs is a Smart Network Interface Controller (NIC), a load-balancing NIC, or a speed-optimized NIC.

Figure 6:
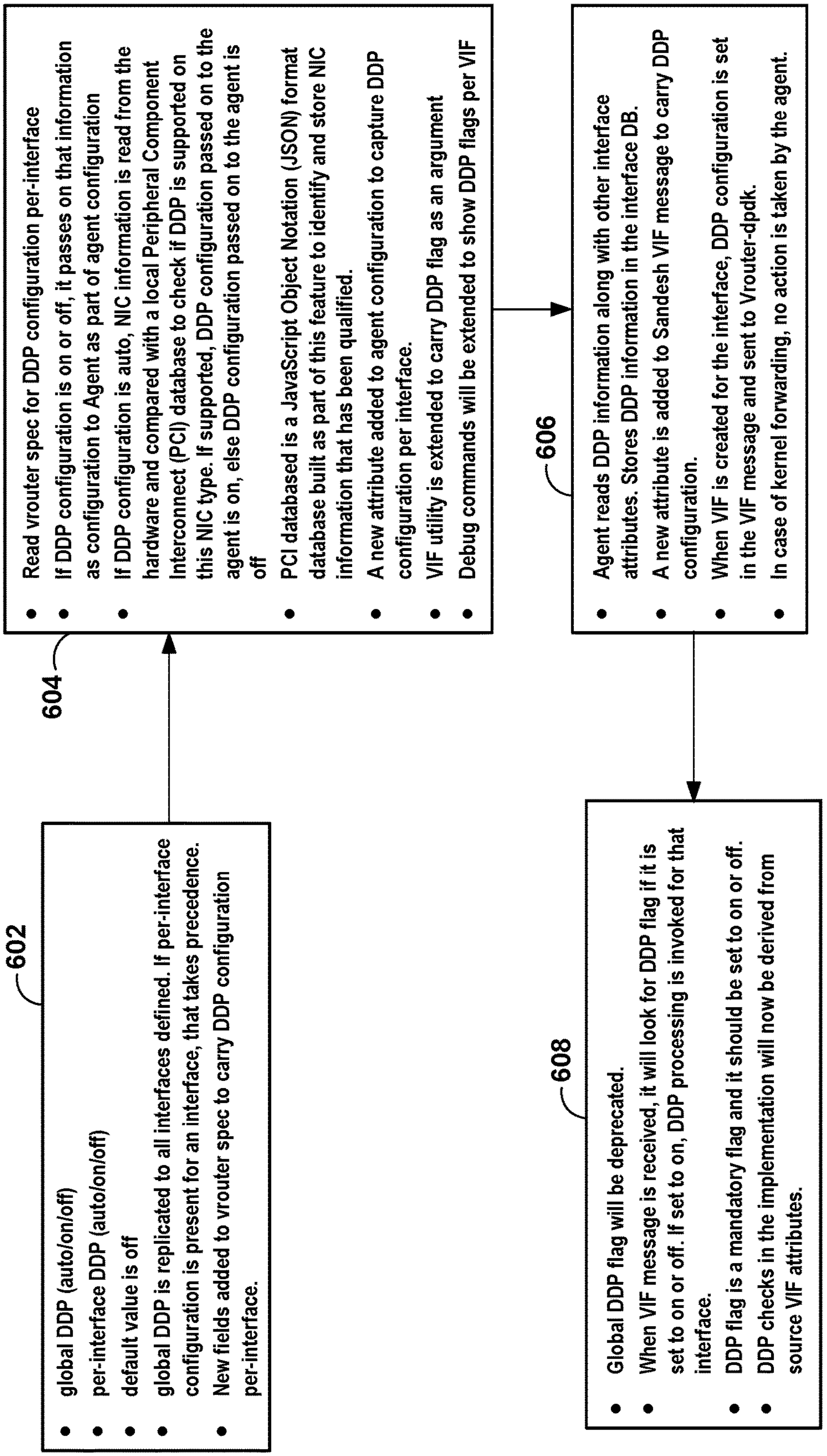
FIG. 6 is a flowchart illustrating an example operation of a computing system operating in accordance with the techniques of the disclosure.

FIG. 6 is a flowchart illustrating an example operation of a computing system operating in accordance with the techniques of the disclosure.

A helm chart specifies configuration information for a physical interface of a computing device, such as a server (602). Such configuration information may include:

global DDP (auto/on/off)

per-interface DDP (auto/on/off)

default value is off global DDP is replicated to all interfaces defined. If per-interface configuration is present for an interface, that takes precedence.

New fields added to vrouter spec to carry DDP configuration per-interface.

A deployer executed by the containerized network router configures a virtual router (604). The containerized network router performs the following functions:

Read vrouter spec for DDP configuration per-interface

If DDP configuration is on or off, it passes on that information as configuration to Agent as part of agent configuration If DDP configuration is auto, NIC information is read from the hardware and compared with a local Peripheral Component Interconnect (PCI) database to check if DDP is supported on this NIC type. If supported, DDP configuration passed on to the agent is on, else DDP configuration passed on to the agent is off PCI databased is a JavaScript Object Notation (JSON) format database built as part of this feature to identify and store NIC information that has been qualified.

A new attribute added to agent configuration to capture DDP configuration per interface.

VIF utility is extended to carry DDP flag as an argument.

Debug commands will be extended to show DDP flags per VIF.

A virtual router agent executed by the containerized network router configures the virtual interface (606). The agent performs the following functions:

Agent reads DDP information along with other interface attributes. Stores DDP information in the interface DB.

A new attribute is added to Sandesh VIF message to carry DDP configuration.

When VIF is created for the interface, DDP configuration is set i the VIF message and sent to Vrouter-dpdk.

In case of kernel forwarding, no action is taken by the agent.

A Vrouter-DPDK executed by the containerized network router performs DDP configuration (608). The Vrouter-DPDK performs the following functions:

Global DDP flag will be deprecated.

When VIF message is received, it will look for DDP flag if it is set to on or off. If set to on, DDP processing is invoked for that interface.

DDP flag is a mandatory flag and it should be set to on or off.

DDP checks in the implementation will now be derived from source VIF attributes.

Helm Configuration

In some examples, containerized network router 500 is deployed using helm charts. Interfaces that are partly connected to containerized network router 500 are mentioned in the helm chart. For a feature such as DDP, the configuration option mentioned above is specified under interface(s) in values.yaml and values_L3.yaml files.

If no DDP configuration is specified, the default value is "Off." The global DDP configuration option may continue to be supported and is extended for all modes (L2/L2-L3 and L3). Global DDP configuration option also takes auto/on/off.

Configuration Precedence is defined as follow.

Global DDP configuration applied to all interfaces in the system.

When configured, the per interface DDP configuration overrides the global configuration for that interface.

A Sample helm configuration for L2/L2-L3/L3 given below:

```
global:
  fabric Interfaces:
    - 198.51.100.0/24:
    # This option overrides global configuration for this interface.
    DDP: "auto" # Possible values are auto/on/off
    - 198.51.200.0/24
    # If no DDP specified, interface takes global DDP configuration
```

-continued

```
  - enp58s0f1vf0:
        interface_mode: trunk
        # This option overrides global configuration for this
interface.
        DDP: "off" # Possible values are auto/on/off
  - enp59s0f0vf0:
        interface_mode: trunk
        # This option overrides global configuration for this
interface.
        DDP: "on" # Possible values are auto/on/off
  fabric WorkloadInterface:
  - enp60s0f1vf0:
  # global DDP configuration. This is applied to all interfaces. If this
configuration is not defined, default is 'off'
  DDP: "off" # Possible values are auto/on/off
```

Figure 7A:
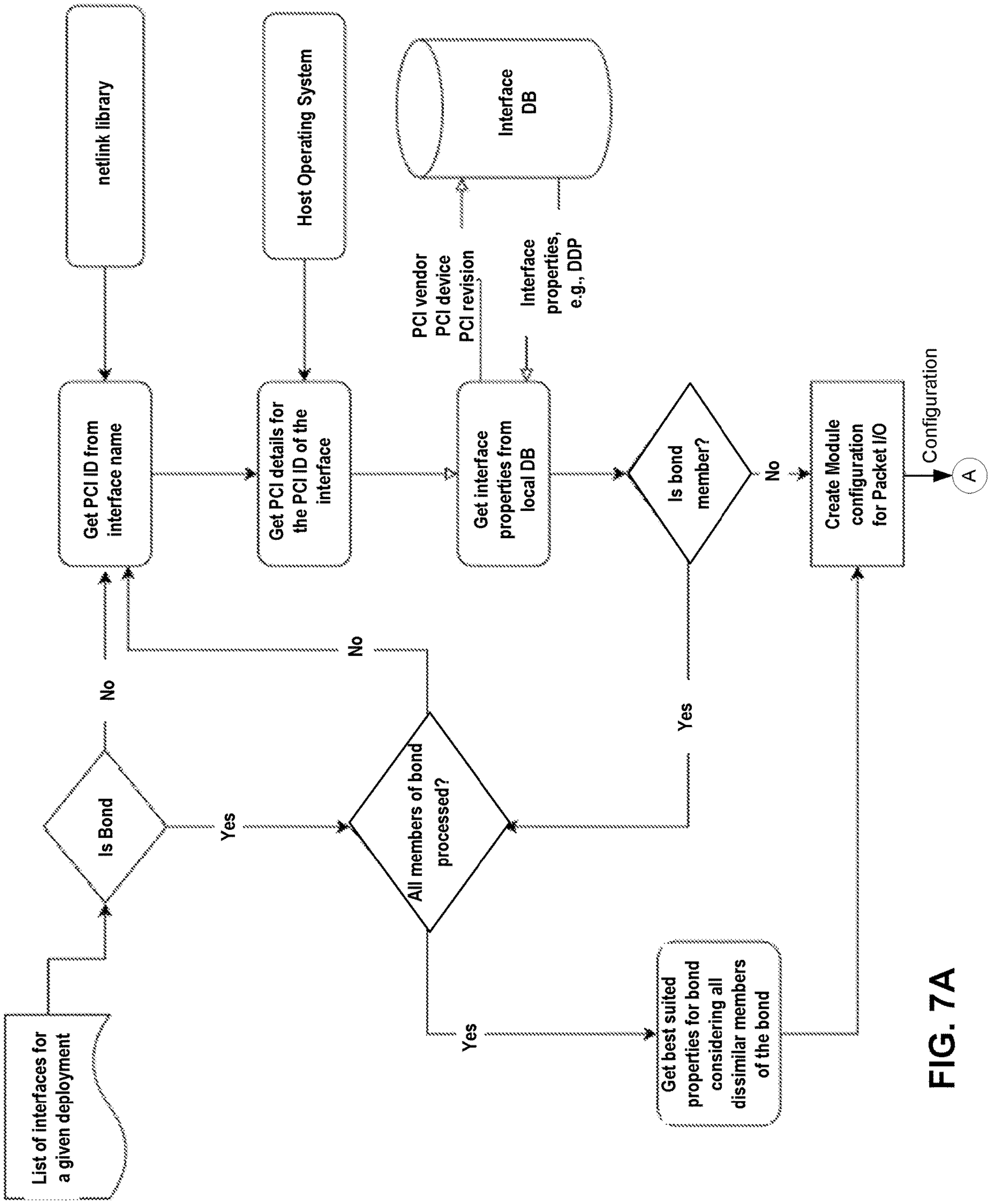
FIGS. 7A-7B are flowcharts illustrating an example operation in accordance with the techniques of the disclosure.
Figure 7B:
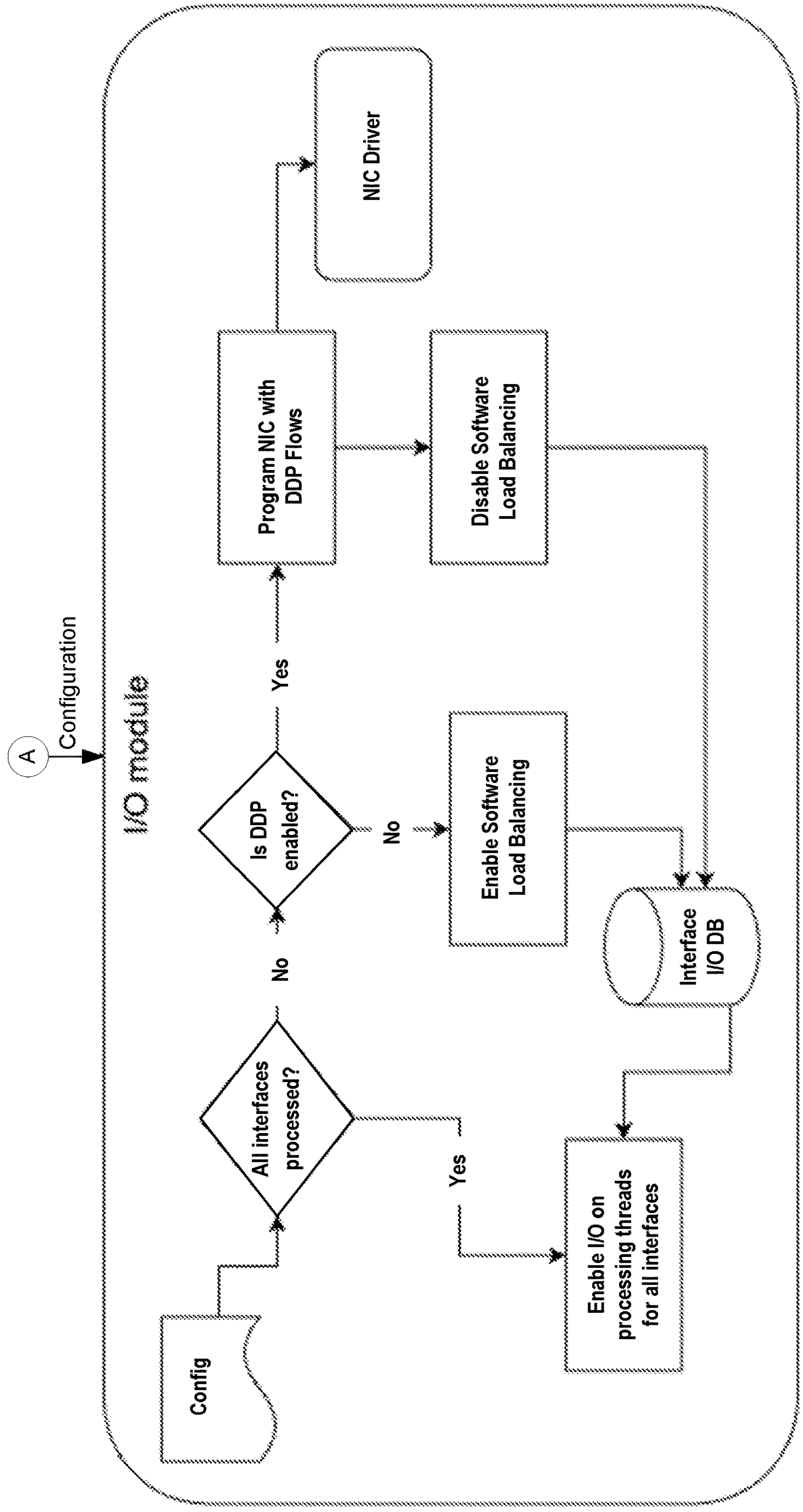

FIGS. 7A-7B are flowcharts illustrating an example operation performed in accordance with the techniques of the disclosure. More specifically, FIGS. 7A-7B illustrate an example operation for configuring a virtual interface of a containerized network router using a configuration profile selected using hardware attributes of a computing system executing the containerized network router, in accordance with the techniques of the disclosure. FIG. 7A illustrates a first portion of the operation of FIGS. 7A-7B with respect to the functionality of the deployer of the containerized network router, in accordance with the techniques of the disclosure.

Deployer Configuration

Configuration passed on from helm to deployer. DDP configuration will become an option per interface in the VRouter spec. Deployer will have a database of PCI devices that support DDP. This database of PCI information will be part of deployer as a JSON file.

The deployer may see the DDP option enabled on an interface as follows:

- Auto: it will check PCI information of the interface read from the kernel. A true/false value will be stored per interface in agent configuration and vif command in dpdk-supervisor based on whether the PCI version, type and flags of the interface found in internal database of PCI devices.
  - If interface is Physical interface, a profile for the interface is matched on PCI vendor ID and device ID
  - If interface is Virtual function, a profile for the interface is matched on PCI vendor ID and device ID. PCI vendor ID and device ID are different for VF from their PFs. PCI Database will capture these differences.
- On: A true value will be stored for that interface in agent configuration and vif command in dpdk-supervisor
- Off: A false value will be stored for that interface in agent configuration and vif command in dpdk-supervisor From deployers, agents and DPDK, DDP flag will always be populated and will be either true or false. DDP may therefore be defined per NIC for some NIC types and per PF/VF for other NIC variations. This is abstracted out in the definition of PCI database.

FIG. 7B illustrates a second portion of the operation of FIGS. 7A-7B with respect to the functionality of the virtual router agent and VRrouter-DPDK of the containerized network router, in accordance with the techniques of the disclosure.

Agent Configuration

A sample agent configuration is provided below:

```
[DEFAULT]
agent_mode                  = vrouter-agent-passive
platform                    = dpdk
physical_interface_name_list = enp58s0f1vf1 enp59s0f0vf1 enp58s0f1 vf0
enp59s0f0vf0 enp60s0f1vf0
physical_interface_type = fabric fabric fabric fabric workload
physical_interface_DDP_enable = true true false true false
physical_interface_mac_list    = a0:b0:c0:d0:e0:f1 a0:b0:c0:d0:e0:f2
a0:b0:c0:d0:e0:f3 a0:b0:c0:d0:e0:f4 a0:b0:c0:d0:e0:f5
physical_interface_pci_list    = 0000:af:02.0 0000:af:02.1 0000:af:03.0
0000:af:03.1 0000:af:04.0
```

Agent reads agent configuration created by deployer and stores interface to DDP configuration along with other interface attributes. A new field will be added to Sandesh message for VIF. When VIF is created/updated/deleted for given interface, DDP flag is set accordingly and sent to VRouter-DPDK. DDP flag will be set to false in kernel forwarding mode. DDP support in Agent can be extended to CN2 as well.

An example Sandesh VIF message update is provided below:

```
buffer sandesh vr_interface_req {
   1: sandesh_op h_op;
   2: u32            vifr_core;
   3: 132            vifr_type;
   4: 132            vifr_flags;
   5: 132            vifr_vrf;
   . . .
   . . .
   105: byte         vifr_DDP_enable;
}
```

VRouter-DPDK Configuration

The present implementation of DDP expects-DDP flag to be sent as a process argument. This is changed to a per-vif attribute. A vif binary has a new mandatory attribute-DDP that takes 1 or 0.

An example DDP implementation in vrouter-dpdk is set forth below:

- dpdk-supervisor and contrail-vrouter-dpdk processes come up
- Both processes Initializes their modules.
- dpdk-supervisor sends first set of VIF for vhost0 and PCI interface(s) with –DDP 0. it is not necessary to query DDP flag here as this VIF is deleted and recreated by agent later on.
- In contrail-vrouter-dpdk, DDP is enabled/disabled and relevant FW is processed as part of VIF message handling.
- FW selection for given interface type is done by lookup up in the PCI database. This is the same database that is used by deployer to identify if PCI can support DDP or not.

DDP is an init time attribute for the VIF. This means that this attribute is set or unset when system comes up.

PCI Database

A database of PCI device information that are relevant for DDP are captured and stored in a JSON format. This file includes PCI device make, sub version and flags as relevant to identify the PCI device uniquely. PF and VF functions will have different PCI definitions. The databased may include profiles for interfaces that capture all variations as necessary.

This database JSON file will be part of vrouter containers and will be in read-only mode. Deployer will parse this information to process DDP as described above. In future, vrouter-dpdk will parse this information to get flow details.

An example database entry is provided below:

```
{
  "_description": "This is NIC profile database. This is used
to derive per NIC behavior at the time of deployment.",
  "vendors": [
  {
    "_description": "Intel",
    "vendor": "0x8086",
    "whildcard": "revision",
    "devices": [
    {
      "_description": "E810 PF",
      "device": "0x159b",
      "revision": "0x02",
      "features": {
      "DDP": true
      }
    }
    ]
  }
  ]
}
```

Debugging

Vif command will be updated to show whether DDP is enabled/disable.

```
vif0/0 Socket: unix MTU: 1514
  Type:Agent HWaddr:00:00:5e:00:01:00 IPaddr:0.0.0.0
  Vrf:65535 Mcast Vrf:65535 Flags: L3Er QOS:-1 Ref:3
  RX queue errors to lcore 000000000000
  RX packets:0 bytes:0 errors:0
  TX packets:0 bytes:0 errors:0
  Drops:0
vif0/1 PCI: 0000:af:00.0 (Speed 10000, Duplex 1) NH: 6
  MTU: 65535
  Type:Physical HWaddr:b4:96:91:dd:61:74 IPaddr:
    0.0.0.0
  DDP: ON SwLB: OFF
  Vrf:0 Mcast Vrf:0 Flags: TcL3L2Vof QOS:0 Ref:8
  RX port packets:1 errors:0
  RX queue errors to lcore 000000000000
  Fabric Interface: 0000:af:00.0 Status: UP Driver: net-
    _ice
  RX packets:1 bytes:325 errors:0
  TX packets: 0 bytes:0 errors:0
  Drops:0
vif0/2 PCI: 0000:3b:00.1 (Speed 25000, Duplex 1) NH: 7
  MTU: 65535
  Type:Physical HWaddr:40:a6:b7:2a:e2:c5 IPaddr:
    112.1.1.1
  IP6addr:fe80::e02a:d3ff:fe33:aed6
  DDP: OFF SwLB: ON
  Vrf:0 Mcast Vrf:0 Flags: TcL3L2Vof QOS:0 Ref:8
  RX port packets:3 errors:0
  RX queue errors to lcore 000000000000
  Fabric Interface: 0000:3b:00.1 Status: UP Driver:
    net_i40e
  RX packets:3 bytes:981 errors:0
  TX packets:0 bytes:0 errors:0
  Drops:0
vif0/3 PMD: enp175s0f0 MTU: 1514
  Type:Host HWaddr:b4:96:91:dd:61:74 IPaddr:0.0.0.0
  DDP: OFF SwLB: ON
  Vrf:65535 Mcast Vrf:65535 Flags: L3DProxyEr
    QOS:-1 Ref:6 TxXVif:1
  RX queue errors to lcore 000000000000
  RX packets:0 bytes:0 errors:0
  TX packets:1 bytes:325 errors:0
  Drops:0
  TX queue packets:1 errors:0
  TX device packets:0 bytes:0 errors:1
vif0/4 PMD: enp59s0f1 NH: 15 MTU: 1514
  Type:Host HWaddr:40:a6:b7:2a:e2:c5 IPaddr:
    112.1.1.1
  IP6addr:fe80::e02a:d3ff:fe33:aed6
  DDP: OFF SwLB: ON
  Vrf:0 Mcast Vrf:65535 Flags: L3DProxyEr QOS:-1
    Ref:12 TxXVif:2
  RX queue errors to lcore 000000000000
  RX packets:0 bytes:0 errors:0
  TX packets:3 bytes:981 errors:0
  Drops:0
  TX queue packets:3 errors:0
  TX device packets:3 bytes:981 errors:0
```

New logs will be added to the agent to show what the current state of DDP is while creating VIF.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:

hardware-based physical interfaces;

storage media; and processing circuitry in communication with the storage media, the processing circuitry is configured to:

execute a virtual router that implements a data plane and is configurable with virtual interfaces;

receive information specifying one or more hardware attributes of each physical interface of the physical interfaces;

for each physical interface of the physical interfaces, obtain, based at least in part on the corresponding one or more hardware attributes of the physical interface, a corresponding configuration for a corresponding virtual interface of the virtual interfaces of the virtual router; and configure each virtual interface of the virtual interfaces with the corresponding configuration to cause the virtual router to perform forwarding of network traffic to the corresponding physical interface of the physical interfaces.

2. The computing system of claim 1, wherein the physical interfaces comprise:

a first physical interface having one or more first hardware attributes; and a second physical interface having one or more second hardware attributes that are different from the one or more first hardware attributes.

3. The computing system of claim 1, wherein the physical interfaces comprise two or more of:

a Smart Network Interface Controller (NIC) comprising a first physical interface;

a load-balancing NIC comprising a second physical interface; and a speed-optimized NIC comprising a third physical interface.

4. The computing system of claim 1, wherein the information specifying the one or more hardware attributes of each physical interface of the physical interfaces comprises information specifying one or more of a transmission rate, a Maximum Transmission Unit (MTU), a processor type, or an amount of memory of a Network Interface Controller (NIC) comprising the physical interface.

5. The computing system of claim 1, wherein the information specifying the one or more hardware attributes of each physical interface of the physical interfaces comprises information specifying one or more of a make identifier, a sub-version identifier, or a revision identifier.

6. The computing system of claim 1, wherein the information specifying the one or more hardware attributes of each physical interface of the physical interfaces comprises information specifying whether each physical interface of the physical interfaces is a single interface or a bonded or aggregate interface.

7. The computing system of claim 1, wherein the information specifying the one or more hardware attributes of each physical interface of the physical interfaces comprises a Helm chart specifying the one or more hardware attributes of each physical interface of the physical interfaces.

8. The computing system of claim 1, wherein, to obtain the corresponding configuration for the corresponding virtual interface of the virtual interfaces of the virtual router, the processing circuitry is configured to:

obtain a default configuration for a first virtual interface of the virtual interfaces corresponding to a first physical interface of the physical interfaces for which the computing system does not store a configuration.

9. The computing system of claim 1, wherein, to configure each virtual interface of the virtual interfaces with the corresponding configuration to perform forwarding of the network traffic to the corresponding physical interface of the physical interfaces, the processing circuitry is configured to:

configure the virtual interfaces with the corresponding configurations so as to perform load balancing of the network traffic across the physical interfaces, in accordance with the one or more hardware attributes of each physical interface of the physical interfaces, and despite the physical interfaces comprising different attributes of the one or more hardware attributes.

10. The computing system of claim 1, wherein the information specifying the one or more hardware attributes of each physical interface of the physical interfaces comprises information specifying a Dynamic Device Personalization (DDP) capability of the physical interface of the physical interfaces.

11. The computing system of claim 1, wherein the information specifying the one or more hardware attributes of each physical interface of the physical interfaces comprises:

first information specifying that a first physical interface of the physical interfaces is Dynamic Device Personalization (DDP) capable, and second information specifying that a second physical interface of the physical interfaces is not DDP capable.

12. The computing system of claim 11, wherein, to configure each virtual interface of the virtual interfaces with the corresponding configuration to perform forwarding of the network traffic to the corresponding physical interface of the physical interfaces, the processing circuitry is configured to:

configure a first Network Interface Controller (NIC) to perform hardware-based load-balancing of network traffic forwarded via the first physical interface in accordance with DDP; and configure the virtual router to perform software-based load-balancing of network traffic forwarded via the second physical interface.

13. The computing system of claim 1, wherein the processing circuitry is configured to execute a containerized network router, wherein the containerized network router comprises:

a containerized routing protocol daemon that implements a control plane; and the virtual router that implements the data plane.

14. A method comprising:

executing, by processing circuitry of a computing system comprising hardware-based physical interfaces, a virtual router that implements a data plane and is configurable with virtual interfaces;

receiving, by the processing circuitry, information specifying one or more hardware attributes of each physical interface of the physical interfaces;

for each physical interface of the physical interfaces, obtaining, by the processing circuitry, based at least in part on the corresponding one or more hardware attributes of the physical interface, a corresponding configuration for a corresponding virtual interface of the virtual interfaces of the virtual router; and configuring, by the processing circuitry, each virtual interface of the virtual interfaces with the corresponding configuration to cause the virtual router to perform forwarding of network traffic to the corresponding physical interface of the physical interfaces.

15. The method of claim 14, wherein the physical interfaces comprise:

a first physical interface having one or more first hardware attributes; and a second physical interface having one or more second hardware attributes that are different from the one or more first hardware attributes.

16. The method of claim 14, wherein the information specifying the one or more hardware attributes of each physical interface of the physical interfaces comprises information specifying one or more of a make identifier, a sub-version identifier, or a revision identifier.

17. The method of claim 14, wherein configuring each virtual interface of the virtual interfaces with the corresponding configuration to perform forwarding of the network traffic to the corresponding physical interface of the physical interfaces comprises:

configuring the virtual interfaces with the corresponding configurations so as to perform load balancing of the network traffic across the physical interfaces, in accordance with the one or more hardware attributes of each physical interface of the physical interfaces, and despite the physical interfaces comprising different attributes of the one or more hardware attributes.

18. The method of claim 14, wherein the information specifying the one or more hardware attributes of each physical interface of the physical interfaces comprises:

first information specifying that a first physical interface of the physical interfaces is Dynamic Device Personalization (DDP) capable, and second information specifying that a second physical interface of the physical interfaces is not DDP capable.

19. The method of claim 14, further comprising executing, by the processing circuitry, a containerized network router, wherein the containerized network router comprises:

a containerized routing protocol daemon that implements a control plane; and the virtual router that implements the data plane.

20. Non-transitory, computer-readable media comprising instructions that, when executed, are configured to cause processing circuitry to:

execute a virtual router that implements a data plane and is configurable with virtual interfaces;

receive information specifying one or more hardware attributes of each physical interface of physical interfaces of a computing system;

for each physical interface of the physical interfaces, obtain, based at least in part on the corresponding one or more hardware attributes of the physical interface, a corresponding configuration for a corresponding virtual interface of the virtual interfaces of the virtual router; and configure each virtual interface of the virtual interfaces with the corresponding configuration to cause the virtual router to perform forwarding of network traffic to the corresponding physical interface of the physical interfaces.

* * * * *